United States Patent
Zhang et al.

(10) Patent No.: US 9,973,318 B2
(45) Date of Patent: May 15, 2018

(54) TRANSMISSION METHOD OF A CHANNEL STATE INFORMATION REFERENCE SIGNAL, BASE STATION, TERMINAL, SYSTEM, MACHINE-READABLE PROGRAM AND STORAGE MEDIUM STORING A MACHINE-READABLE PROGRAM

(71) Applicant: FUJITSU LIMITED, Kawasaki-shi, Kanagawa (JP)

(72) Inventors: Yi Zhang, Beijing (CN); Jian Zhang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 213 days.

(21) Appl. No.: 14/799,946

(22) Filed: Jul. 15, 2015

(65) Prior Publication Data
US 2015/0318972 A1   Nov. 5, 2015

Related U.S. Application Data

(63) Continuation of application No. PCT/CN2013/070805, filed on Jan. 21, 2013.

(51) Int. Cl.
| | |
|---|---|
| *H04L 5/00* | (2006.01) |
| *H04B 7/06* | (2006.01) |
| *H04W 80/04* | (2009.01) |

(52) U.S. Cl.
CPC ......... *H04L 5/0057* (2013.01); *H04B 7/0626* (2013.01); *H04L 5/0007* (2013.01); *H04L 5/0051* (2013.01); *H04W 80/04* (2013.01)

(58) Field of Classification Search
CPC ..... H04W 80/24; H04W 80/04; H04B 7/0626
(Continued)

(56) References Cited

U.S. PATENT DOCUMENTS

| 9,313,774 | B2 | 4/2016 | Abe et al. | |
|---|---|---|---|---|
| 2012/0108254 | A1* | 5/2012 | Kwon | H04L 5/0023 455/450 |
| 2012/0201163 | A1* | 8/2012 | Jongren | H04W 24/10 370/252 |

FOREIGN PATENT DOCUMENTS

| CN | 101340228 A | 1/2009 |
|---|---|---|
| CN | 101841828 A | 9/2010 |

(Continued)

OTHER PUBLICATIONS

First Office Action issued by the Japan Patent Office for corresponding Japanese Patent Application No. 2015-552969, dated Jan. 4, 2017, with an English translation.

(Continued)

*Primary Examiner* — Ricky Ngo
*Assistant Examiner* — Richard Chang
(74) *Attorney, Agent, or Firm* — Myers Wolin, LLC

(57) ABSTRACT

A transmission method of a channel state information reference signal (CSI-RS), including: selecting from a resource block s groups of resource elements for transmitting CSI-RSs of $m_i$ antenna ports, or selecting at least one resource element from each of r resource blocks for transmitting CSI-RSs of $m_j$ antenna ports, to constitute a resource element group to which CSI-RSs of n antenna ports correspond, $n > m_i$, $n > m_j$, $1 \leq i \leq s$, $1 \leq j \leq r$; transmitting the CSI-RSs of n antenna ports to a terminal via the resource elements, and informing related information to the terminal by using indication signaling and further provides a base station, a terminal, a system, a machine-readable program and a storage medium storing a machine-readable program. The present disclosure may provide CSI-RSs supporting more antenna ports according to CSI-RSs of existing antenna (Continued)

ports of a low number, thereby fully bringing performance of a large-scale antenna system into play.

18 Claims, 13 Drawing Sheets

(58) Field of Classification Search
USPC .......................................................... 370/329
See application file for complete search history.

(56) References Cited

FOREIGN PATENT DOCUMENTS

| CN | 102237951 A | 11/2011 |
|----|-------------|---------|
| JP | 2012-44322 A | 3/2012 |
| WO | 2011/087345 A2 | 7/2011 |
| WO | 2011/152651 A2 | 12/2011 |

OTHER PUBLICATIONS

Extended European search report with supplementary European search report and the European search opinion issued by the European Patent Office for corresponding European Patent Application No. 13871754.1 dated Aug. 3, 2016.
Qualcomm Europe, "Details of CSI-RS", Agenda Item:7.3.2, 3GPP TSG-RAN WG1 Meeting #58bis, R1-094214, Miyazaki, Japan, Oct. 12-16, 2009.
Texas Instruments, "Remaining CSI-RS signaling aspects in Rel-10", Agenda Item: 6.3.1.1, 3GPP TSG-RAN WG1 Meeting #62bis, R1-105282, Xian, China, Oct. 11-15, 2010.
International Search Report issued for corresponding International Patent Application No. PCT/CN2013/070805, mailed Oct. 31, 2013, with an English translation.
Notice of Preliminary Rejection issued by the Korean Intellectual Property Office for corresponding Korean Patent Application No. 10-2015-7019854, dated Nov. 16, 2016, with English translation.
Communication pursuant to Article 94(3) EPC issued by the European Patent Office for corresponding European Patent Application No. 13 871 754.1-1219, dated Mar. 8, 2018.

* cited by examiner

TRANSMISSION METHOD OF A CHANNEL STATE INFORMATION REFERENCE SIGNAL, BASE STATION, TERMINAL, SYSTEM, MACHINE-READABLE PROGRAM AND STORAGE MEDIUM STORING A MACHINE-READABLE PROGRAM

CROSS REFERENCE TO RELATED APPLICATIONS

This application is a continuation application of International Application PCT/CN2013/070805 filed on Jan. 21, 2013, the entire contents of which are incorporated herein by reference.

TECHNICAL FIELD

The present disclosure relates to the field of communication technologies, and in particular to a transmission method of a channel state information reference signal, base station, terminal, system, machine-readable program and storage medium storing a machine-readable program.

BACKGROUND

Large-scale antennas are used to enhance coverage of a system, eliminate inter-user interference, reduce number of websites and lower cost of operation and maintenance, which is one of hot candidate technologies in an LTE-A system. Vertical sectorization technology and user 3-dimensional beamforming technology are technologies which are relatively easily industrialized in a large-scale antenna system. FIG. 1 shows a schematic diagram of the vertical sectorization technology; wherein user equipment 104 is spatially multiplexed and a capacity of the system is improved by beamforming by a base station end 102. FIG. 2 shows a schematic diagram of the user 3-dimensional beamforming technology; wherein by beam alignment by the base station end 102, the user equipment 104 is enabled to acquire a higher beamforming gain, and interference between the user equipment 104 is reduced; furthermore, the system is able to support a multi-user multi-antenna technology with more data streams, and the user equipment 104 is spatially multiplexed, further improving the capacity of the system. However, all these technologies need that spatial resolution of the system is increased, that is, the system needs to use more antenna ports.

However, as an LTE-A R10/11 system supports only at most 8 antenna ports, support of more antenna ports by channel state information reference signals (CSI-RSs) cannot be realized, hence, as the increase of the number of antennas, a limited number of antenna ports restricts the performance of the large-scale antenna system.

SUMMARY

In light of the above, the present disclosure proposes a new technical solution, in which channel state information reference signals supporting more antenna ports may be provided according to existing channel state information reference signals of a low number of antenna ports, thereby fully bringing performance of a large-scale antenna system into play, and further acquiring a system capacity gain brought by a large amount of antennas.

Due to the reasons above, the present disclosure provides a transmission method of a channel state information reference signal, including: selecting s groups of resource elements from a resource block, an $A_i$-th group of resource elements being used for transmitting resource elements of channel state information reference signals of $m_i$ antenna ports, so as to constitute a resource element group to which channel state information reference signals of n antenna ports correspond; where, s>1, n>$m_i$, 1≤i≤s; or in r resource blocks, selecting at least one resource element from an $A_j$-th resource block for transmitting channel state information reference signals of $m_j$ antenna ports, and constituting a resource element group to which channel state information reference signals of n antenna ports correspond by using all the selected resource elements; where, r>1, n>$m_j$, 1≤j≤r; and transmitting the channel state information reference signals of the n antenna ports to one or more terminals by using the resource element group. In such a technical solution, as resource elements in each resource block for transmitting CSI-RSs of 2, 4 or 8 antenna ports, are defined in existing standards, resource element group for transmitting CSI-RSs of more antenna ports may be obtained in a combined manner by selecting resource elements originally used for transmitting CSI-RSs of 2, 4 or 8 antenna ports from one or more resource blocks, thereby facilitating fully bringing performance of a large-scale antenna system into play, and further acquiring a system capacity gain brought by a large amount of antennas. And at the same time, as the resource elements originally used for transmitting CSI-RSs of 2, 4 or 8 antenna ports are used, the number of transmission antenna ports supported by the CSI-RSs is extended, while reducing influence on previous users as possible.

The present disclosure further provides a transmission method of a channel state information reference signal, including: receiving channel state information reference signals of n antenna ports, the channel state information reference signals of n antenna ports being transmitted by using a resource element group constituted by s groups of resource elements selected from a resource block, an $A_i$-th group of resource elements being used for transmitting channel state information reference signals of $m_i$ antenna ports, s>1, n>$m_i$, 1≤i≤s; or being transmitted by using a resource element group constituted by all selected resource elements by selecting at least one resource element from $A_j$ resource blocks for transmitting channel state information reference signals of $m_j$ antenna ports in r resource blocks, r>1, n>$m_j$, 1≤j≤r. In such a technical solution, as resource elements in each resource block for transmitting CSI-RSs of 2, 4 or 8 antenna ports, are defined in existing standards, groups of resource elements for transmitting CSI-RSs of more antenna ports may be obtained in a combined manner by selecting resource elements originally used for transmitting CSI-RSs of 2, 4 or 8 antenna ports from one or more resource blocks, thereby facilitating fully bringing performance of a large-scale antenna system into play, and further acquiring a system capacity gain brought by a large amount of antennas. And at the same time, as the resource elements originally used for transmitting CSI-RSs of 2, 4 or 8 antenna ports are used, the number of transmission antenna ports supported by the CSI-RSs is extended, while reducing influence on previous users as possible.

The present disclosure further provides a base station, including: a data processing module configured to select s groups of resource elements from a resource block, an $A_i$-th group of resource elements being used for transmitting resource elements of channel state information reference signals of $m_i$ antenna ports, so as to constitute a resource element group to which channel state information reference signals of n antenna ports correspond; where, s>1, n>$m_i$, 1≤i≤s, 1≤j≤r; or in r resource blocks, select at least one resource element from an $A_i$-th resource block for transmitting channel state information reference signals of $m_j$ antenna ports, and constitute a resource element group to which channel state information reference signals of n antenna ports correspond by using all the selected resource elements; where, r>1, n>$m_j$, 1≤i≤s, 1≤j≤r; and a data transmitting module configured to transmit the channel state information reference signals of the n antenna ports to one or more terminals by using the resource element group. In such a technical solution, as resource elements in each resource block for transmitting CSI-RSs of 2, 4 or 8 antenna ports, are defined in existing standards, resource element group for transmitting CSI-RSs of more antenna ports may be obtained in a combined manner by selecting resource elements originally used for transmitting CSI-RSs of 2, 4 or 8 antenna ports from one or more resource blocks, thereby facilitating fully bringing performance of a large-scale antenna system into play, and further acquiring a system capacity gain brought by a large amount of antennas. And at the same time, as the resource elements originally used for transmitting CSI-RSs of 2, 4 or 8 antenna ports are used, the number of transmission antenna ports supported by the CSI-RSs is extended, while reducing influence on previous users as possible.

The present disclosure further provides a terminal, including: a data interacting module configured to receive channel state information reference signals of n antenna ports, the channel state information reference signals of n antenna ports being transmitted by using a resource element group constituted by s groups of resource elements selected from a resource block, an $A_i$-th group of resource elements being used for transmitting channel state information reference signals of $m_i$ antenna ports, s>1, n>$m_i$, 1≤i≤s; or being transmitted by using a resource element group constituted by all selected resource elements by selecting at least one resource element from $A_j$ resource blocks for transmitting channel state information reference signals of $m_j$ antenna ports in r resource blocks, r>1, n>$m_j$, 1≤j≤r. In such a technical solution, as resource elements in each resource block for transmitting CSI-RSs of 2, 4 or 8 antenna ports, are defined in existing standards, groups of resource elements for transmitting CSI-RSs of more antenna ports may be obtained in a combined manner by selecting resource elements originally used for transmitting CSI-RSs of 2, 4 or 8 antenna ports from one or more resource blocks, thereby facilitating fully bringing performance of a large-scale antenna system into play, and further acquiring a system capacity gain brought by a large amount of antennas. And at the same time, as the resource elements originally used for transmitting CSI-RSs of 2, 4 or 8 antenna ports are used, the number of transmission antenna ports supported by the CSI-RSs is extended, while reducing influence on previous users as possible.

The present disclosure further provides a system, including the base station as described in any one of the preceding solutions and the terminal as described in any one of the preceding solutions. In such a technical solution, as resource elements in each resource block for transmitting CSI-RSs of 2, 4 or 8 antenna ports, are defined in existing standards, resource element group for transmitting CSI-RSs of more antenna ports may be obtained in a combined manner by selecting resource elements originally used for transmitting CSI-RSs of 2, 4 or 8 antenna ports from one or more resource blocks, thereby facilitating fully bringing performance of a large-scale antenna system into play, and further acquiring a system capacity gain brought by a large amount of antennas. And at the same time, as the resource elements originally used for transmitting CSI-RSs of 2, 4 or 8 antenna ports are used, the number of transmission antenna ports supported by the CSI-RSs is extended, while reducing influence on previous users as possible.

The present disclosure further provides a machine-readable program, when the program is executed in a base station, the program enables a machine to carry out the transmission method of a channel state information reference signal as described above in the base station.

The present disclosure further provides a storage medium in which a machine-readable program is stored, and the machine-readable program enables a machine to carry out the transmission method of a channel state information reference signal as described above in a base station.

With the above technical solutions, CSI-RSs supporting more antenna ports may be provided according to CSI-RSs of existing antenna ports of a low number, thereby fully bringing performance of a large-scale antenna system into play, and further acquiring a system capacity gain brought by a large amount of antennas.

BRIEF DESCRIPTION OF THE DRAWINGS

FIG. 10 shows designed patterns of channel state information reference signals in normal cyclic prefix subframes according to an embodiment of the present disclosure;

FIG. 11 shows designed patterns of channel state information reference signals in normal cyclic prefix subframes according to an embodiment of the present disclosure;

FIG. 12 shows designed patterns of channel state information reference signals in extended cyclic prefix subframes according to an embodiment of the present disclosure;

FIGS. 13A and 13B show designed patterns of channel state information reference signals in extended cyclic prefix subframes according to an embodiment of the present disclosure;

FIG. 14 shows designed patterns of channel state information reference signals in extended cyclic prefix subframes according to an embodiment of the present disclosure;

FIG. 15 shows designed patterns of channel state information reference signals in extended cyclic prefix subframes according to an embodiment of the present disclosure;

FIG. 16 shows designed patterns of channel state information reference signals in extended cyclic prefix subframes according to an embodiment of the present disclosure;

FIG. 17 shows a block diagram of a base station according to an embodiment of the present disclosure;

DETAILED DESCRIPTION

For the foregoing objects, features and advantages of the present disclosure to be more clearly understood, the present disclosure shall be further described in detail below with reference to the accompanying drawings and particular embodiments. It should be noted that the embodiments of this application and features of the embodiments may be combined without conflict.

Many details are described below for full understanding of the present disclosure. However, the present disclosure may be carried out by using other manners than those described herein. Therefore, the present disclosure is not limited to the particular embodiments disclosed below.

In order to acquire a better tradeoff between a reference signal load and an estimated performance of a channel, a density of a CSI-RS is determined as 1 resource element per resource block per port (1RE/RB/Port). In a process of designing a CSI-RS pattern, following principles may be referred to: (1) CSI-RSs of a port 0 and a port 1 are transmitted by using a method of time dimension code division multiplexing; and likewise, CSI-RSs of other even number ports and odd number ports are also transmitted by using the method of time dimension code division multiplexing; (2) resource elements to which CSI-RSs of 2/4/8 ports correspond have a nested structure; (3) conflict with other downlink reference signals is avoided; (4) users of previous releases are relatively less affected; and (5) measurement of channels state information of coordinated multipoint (CoMP) transmission is relatively well supported.

Figure 1:
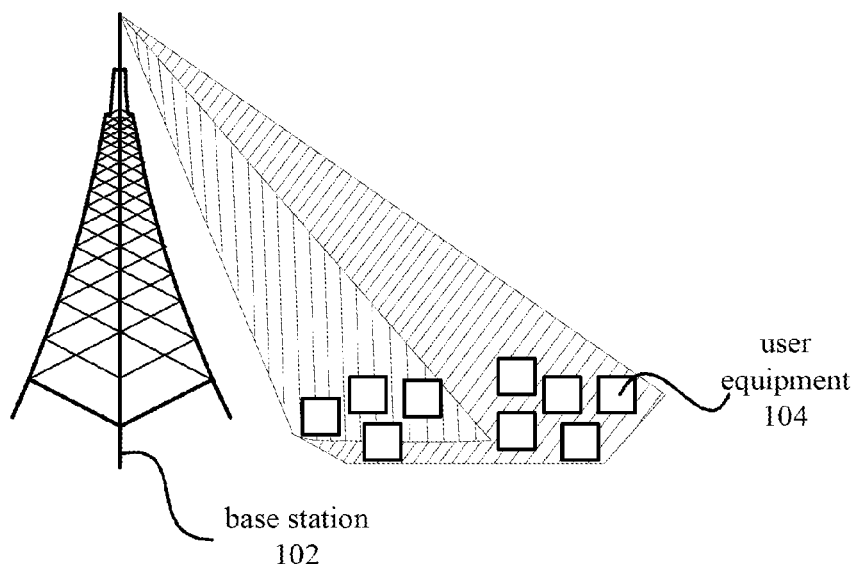
FIG. 1 shows a schematic diagram of a vertical sectorization technology in related technologies.
Figure 2:
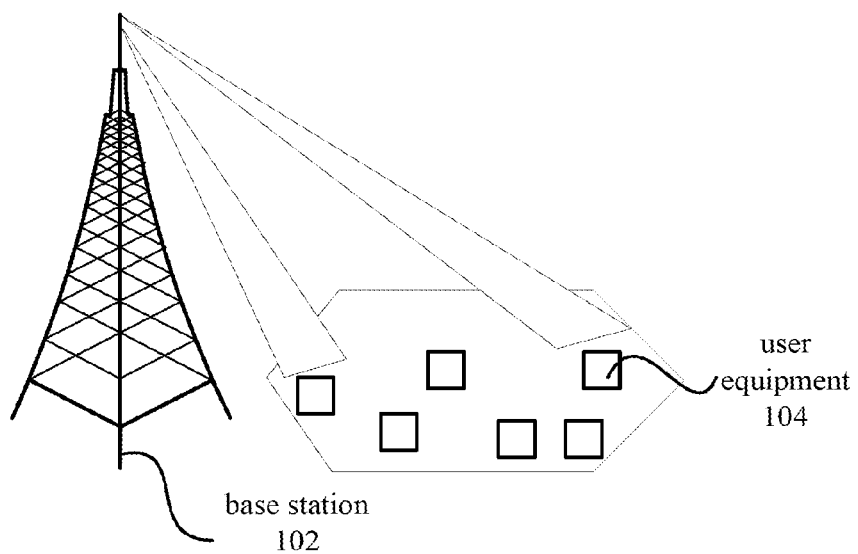
FIG. 2 shows a schematic diagram of a user 3-dimensional beamforming technology in related technologies.
Figure 3:
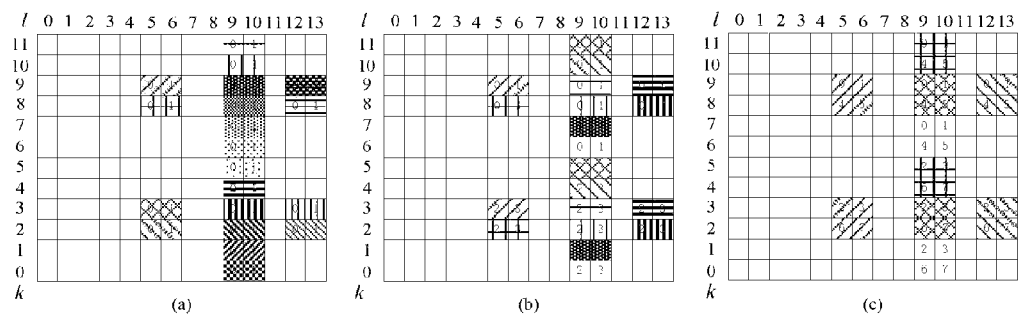
FIG. 3 shows a schematic diagram of a structure of a resource block in a normal cyclic prefix system in related technologies.
Figure 4:
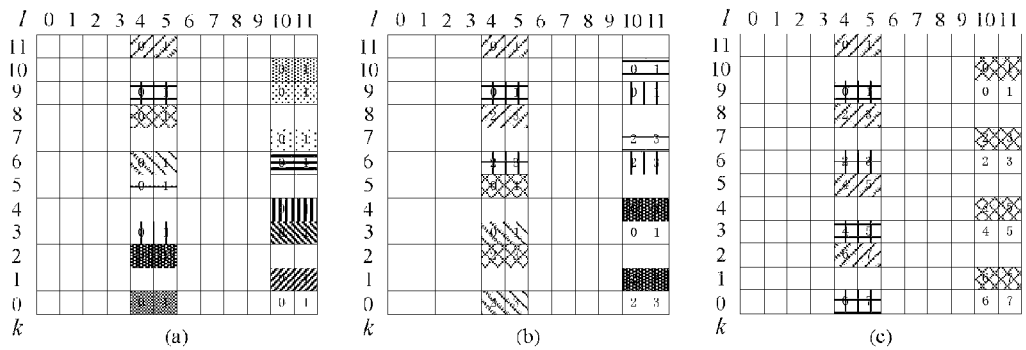
FIG. 4 shows a schematic diagram of a structure of a resource block in an extended cyclic prefix system in related technologies.

Based on the above principles, designed patterns of CSI-RSs of 2/4/8 ports in a resource block under a normal cyclic prefix determined in an LTE-A R101/11 system are as shown in FIG. 3; wherein, FIG. (a) is designed patterns of CSI-RSs of 2 antenna ports, FIG. (b) is designed patterns of CSI-RSs of 4 antenna ports, and FIG. (c) is designed patterns of CSI-RSs of 8 antenna ports (grids filled with numerals 0, 1 or 0, 1, 2, 3 or 0, 1, 2, 3, 4, 5, 6, 7, are resource elements to which CSI-RSs correspond); and at the same time, designed patterns of CSI-RSs of 2/4/8 ports in a resource block under an extended cyclic prefix determined in an LTE-A R101/11 system are as shown in FIG. 4; wherein, FIG. (a) is designed patterns of CSI-RSs of 2 antenna ports, FIG. (b) is designed patterns of CSI-RSs of 4 antenna ports, and FIG. (c) is designed patterns of CSI-RSs of 8 antenna ports (grids filled with numerals 0, 1 or 0, 1, 2, 3 or 0, 1, 2, 3, 4, 5, 6, 7, are resource elements to which CSI-RSs correspond).

Hence, in the technical solutions of the present disclosure, if patterns of CSI-RSs of more (greater than the existing number 8) antenna ports need to be designed, following principles may be employed: (1) following a density of previous CSI-RSs in a time and frequency domain resource block, so as to obtain good tradeoff between a reference signal load and estimated quality of a channel (that is, 1 resource element per resource block per port); (2) avoiding conflict with other reference signals, including existing downlink reference signals or new reference signals that possibly occur; (3) reusing existing CSI-RS resources as possible, thereby reducing effect on users of previous releases; (4) keeping nested structures for 2/4/8 ports as possible, so as to lower complexity of implementation of the system; (5) reusing a time domain code division multiplexing design method; and (6) improving quality of channel estimation as possible on the premise of a determined load density.

Figure 5A:
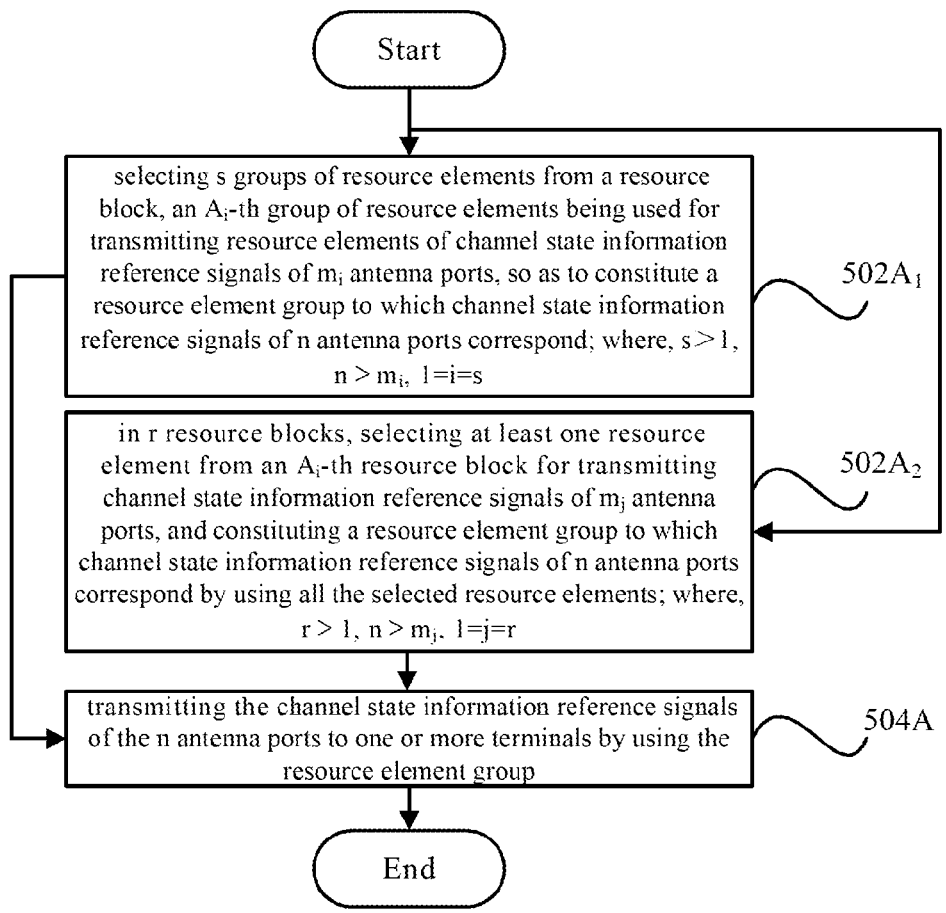
FIG. 5A shows a flowchart of transmitting channel state information reference signals by a base station to a terminal according to an embodiment of the present disclosure.

Based on the above design principles, as shown in FIG. 5A, a flowchart of transmitting channel state information reference signals by a base station to a terminal according to an embodiment of the present disclosure includes:

step $502A_1$: selecting s groups of resource elements from a resource block, an $A_i$-th group of resource elements being used for transmitting resource elements of channel state information reference signals of $m_i$ antenna ports, so as to constitute a resource element group to which channel state information reference signals of n antenna ports correspond; where, s>1, n>$m_i$, 1≤i≤s; or step $502A_2$: in r resource blocks, selecting at least one resource element from an $A_j$-th resource block for transmitting channel state information reference signals of $m_j$ antenna ports, and constituting a resource element group to which channel state information reference signals of n antenna ports correspond by using all the selected resource elements; where, r>1, n>$m_j$, 1≤j≤r; and step 504A: transmitting the channel state information reference signals of the n antenna ports to one or more terminals by using the resource element group.

In this technical solution, steps $502A_1$ and $502A_2$ are two parallel manners. Wherein, in step $502A_2$, numbers of resource elements to which each resource block corresponds may be identical, for example, CSI-RSs of 8 antenna ports may be used to constitute CSI-RSs of 16 antenna ports; and the numbers of resource elements to which each resource block corresponds may also be different, for example, CSI-RSs of 4 antenna ports and of 8 antenna ports may be used to constitute CSI-RSs of 12 antenna ports. As resource elements in each resource block for transmitting CSI-RSs of 2, 4 or 8 antenna ports, are defined in existing standards, a resource element group for transmitting CSI-RSs of more antenna ports may be obtained in a combined manner by selecting resource elements originally used for transmitting CSI-RSs of 2, 4 or 8 antenna ports from one or more resource blocks, thereby facilitating fully bringing performance of a large-scale antenna system into play, and further acquiring a system capacity gain brought by a large amount of antennas. And at the same time, as the resource elements originally used for transmitting CSI-RSs of 2, 4 or 8 antenna ports are used, the number of transmission antenna ports supported by the CSI-RSs is extended, while reducing influence on previous users as possible.

When the resource element group is from the one resource block, a base station further needs to transmit indication signaling to the terminal, so as to inform the terminal of related information. In particular, the indication signaling includes joint signaling and s pieces of configuration signaling corresponding to the s groups of resource elements.

The joint signaling includes a numerical value of a total number n of the antenna ports, a periodicity of the resource block in a time domain and its offset in the time domain periodicity, and a power ratio $\gamma_i$ of assumed data channel transmission in feeding back channel state information by the terminal; and the configuration signaling corresponding to the $A_i$-th group of resource elements includes a number $m_i$ of antenna ports and a position of the $A_i$ group of resource elements in the resource block. With such information, the terminal is enabled to understand a particular position of a currently-used resource block, including which of the resource elements are used, the number of antenna ports to which these resource elements corresponds, and a total number of antenna ports desired to be combined, thereby expanding support of number of antenna ports.

At the same time, when the resource element group is from the r resource blocks, the base station further needs to transmit indication signaling to the terminal, so as to inform the terminal of related information. In particular, the signaling may be divided into two types according to whether there exists predefined information.

First type: there existing predefined information, which may further be divided into following two cases:

case 1: positions of the selected resource elements in each resource block are predefined; at this moment, the signaling includes joint signaling and r pieces of configuration signaling corresponding to the r resource blocks;

the joint signaling includes a numerical value of a total number n of the antenna ports, and the configuration signaling corresponding to the $A_j$-th resource block includes a numerical value of a number $m_j$ of antenna ports, information on a position of the $A_j$-th resource block, and a power ratio $\gamma_j$ of assumed data channel transmission in feeding back channel state information by the terminal; or the joint signaling includes a numerical value of a total number n of the antenna ports, information on a position of a designated resource block in the r resource blocks in a time domain, information on a relative position between the $A_j$-th resource block and the designated resource block, and a power ratio $\gamma_j$ of assumed data channel transmission in feeding back channel state information by the terminal; and the configuration signaling corresponding to the $A_j$-th resource block includes a numerical value of the number $m_j$ of antenna ports;

case 2: when the r resource blocks are located at different subframes of time domain, if an offset of the r resource blocks in time domain is predefined, or when the r resource blocks are located at different subcarriers of frequency domain, if an offset of the r resource blocks in frequency domain is predefined, the indication signaling includes: a numerical value of a number $m_j$ of antenna ports, a numerical value of a total number n of the antenna ports, information on a position (a periodicity and offset) of a designated resource block in the r resource elements in time domain, and a power ratio $\gamma_j$ of assumed data channel transmission in feeding back channel state information by the terminal.

Second type: there existing no predefined information. At this moment, the indication signaling includes joint signaling and r pieces of configuration signaling corresponding to the r resource blocks; wherein, it may be divided into following two cases according to inclusion of information by the two pieces of signaling:

case 1: the joint signaling includes a numerical value of a total number n of the antenna ports, and the configuration signaling corresponding to the $A_j$-th resource block includes a numerical value of a number $m_j$ of antenna ports, information on positions of the resource elements in the $A_j$-th resource block, information on the position of the $A_j$-th resource block, and a power ratio $\gamma_j$ of assumed data channel transmission in feeding back channel state information by the terminal;

when the r resource blocks are located in different subframes of time domain, the information on a position of the $A_j$-th resource block includes periodicity information and offset information, the periodicity information being used for indicating a periodicity of the $A_j$-th resource block in time domain, and the offset information being used for indicating an offset of the $A_j$-th resource block in a time domain periodicity;

or when the r resource blocks are located in different subcarriers of frequency domain, the information on a position of the $A_j$-th resource block includes periodicity information and offset information, the periodicity information being used for indicating a periodicity of the $A_j$-th resource block in time domain, and the offset information being used for indicating an offset of the $A_j$-th resource block in frequency domain;

case 2: the joint signaling includes a numerical value of a total number n of the antenna ports, information on a relative position between the $A_j$-th resource block and the designated resource block, and a power ratio $\gamma_j$ of assumed data channel transmission in feeding back channel state information by the terminal; and the configuration signaling corresponding to the $A_j$-th resource block includes a numerical value of the number $m_j$ of antenna ports, and information on positions of selected resource elements in the $A_j$-th resource block;

when the r resource blocks are located in different subframes of time domain, the information on a relative position includes position information and offset information of the selected resource elements in the $A_j$-th resource block, the offset information being used for indicating an offset of the $A_j$-th resource block from the designated resource block in a time domain periodicity;

or when the r resource blocks are located in different subcarriers of frequency domain, the information on a relative position includes position information and offset information of the selected resource elements in the $A_j$-th resource block, the offset information being used for indicating an offset of the $A_j$-th resource block from the designated resource block in a frequency domain.

The information in the periodicities and offsets of the resource blocks in time domain may be obtained from Table 1:

TABLE 1

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 | and the subframes for transmitting the CSI-RSs need to satisfy a relation:

$$(10n_f + \lfloor n_s/2 \rfloor - \Delta_{CSI-RS}) \bmod T_{CSI-RS} = 0.$$

Figure 5B:
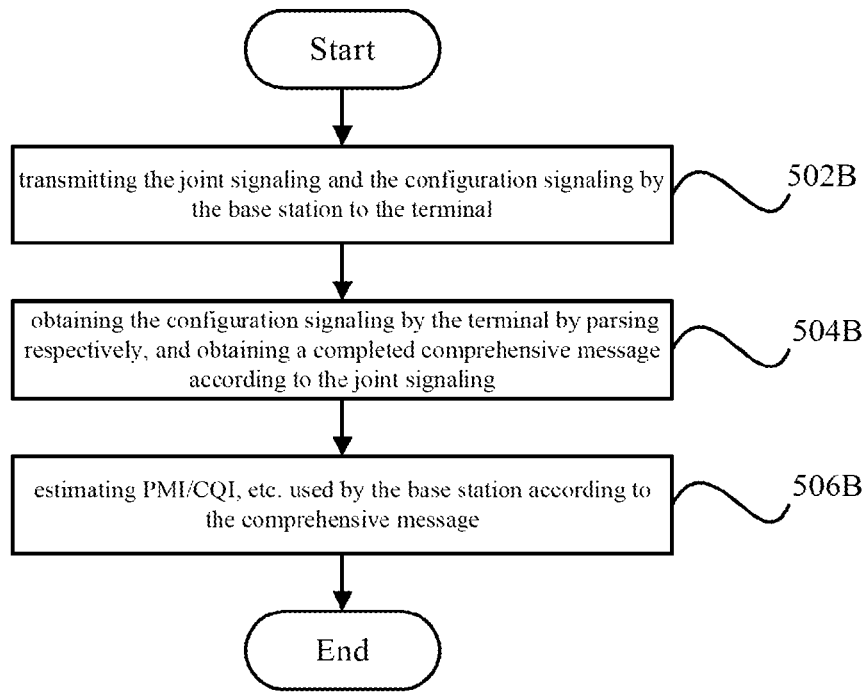
FIG. 5B shows a flowchart of transmitting indication signaling by a base station to a terminal according to an embodiment of the present disclosure.

And message interaction of the signaling is as shown in FIG. 5B, and its process of interaction includes:

step 502B: transmitting the joint signaling and the configuration signaling by the base station to the terminal; assuming that the CSI-RSs of the 16 antenna ports are constituted by combining two resource blocks, the terminal will receive one piece of joint signaling and two pieces of configuration signaling;

step 504B: obtaining the configuration signaling by the terminal by parsing respectively, and obtaining a completed comprehensive message according to the joint signaling; and step 506B: estimating PMI/CQI, etc. used by the base station according to the comprehensive message; wherein a particular algorithm may be defined by a user, such as estimating by using a property of rectangular array.

It should be noted that in the technical solution of the present disclosure, the number $m_j$ of the antenna ports to which each group of selected resource elements corresponds and the value of the total number n of the combined antenna ports are provided. Actually, if such numeral values are not provided, the terminal will default the CSI-RSs of the 16 antenna ports combined in an "additive" manner after receiving CSI-RSs of, for example, two 8 antenna ports, and will default the CSI-RSs of the 8 antenna ports combined in an "additive" manner after receiving CSI-RSs of, for example, two 4 antenna ports; and by using the indication signaling, the combination of the resource blocks is made more flexible; for example, the 16 antenna ports may be formed by combining two 8 antenna ports in an "additive" manner, and may also be formed by combining two 4 antenna ports in an "multiplicative" manner.

The technical solution of the present disclosure shall be described in detail below taking that patterns of the CSI-RSs of the 16 antenna ports are obtained by using the design of patterns of the CSI-RSs of the 8 antenna ports as an example. However, it should be understood by those skilled in the art that when patterns of CSI-RSs of n antenna ports are designed by using patterns of CSI-RSs of m antenna ports, it may be realized theoretically by using the technical solution of the present disclosure only if conditions that the patterns of the CSI-RSs of the m antenna ports are known and n>m.

Normal Cyclic Prefix Subframes

FIG. 3(c) shows a schematic diagram of a structure of a resource block; wherein 12 subcarriers numbered k=0-11 in turn in a frequency domain and 14 OFDM symbols numbered l=0-13 in turn in a time domain are included, and resource elements occupied by CSI-RSs of 8 antenna ports may be divided into five groups: a first group includes resource elements to which a 3rd, 4th, 9th and 10th subcarriers in the frequency domain and a 6th and 7th OFDM symbols in the time domain correspond (i.e. resource elements of k=2, 3, 8, 9 and l=5, 6), a second group includes resource elements to which a 5th, 6th, 11th and 12th subcarriers in the frequency domain and a 10th and 11th OFDM symbols in the time domain correspond (i.e. resource elements of k=4, 5, 10, 11 and l=9, 10), a third group includes resource elements to which a 3rd, 4th, 9th and 10th subcarriers in the frequency domain and a 10th and 11th OFDM symbols in the time domain correspond (i.e. resource elements of k=2, 3, 8, 9 and l=9, 10), a fourth group includes resource elements to which a 1st, 2nd, 7th and 8th subcarriers in the frequency domain and a 10th and 11th OFDM symbols in the time domain correspond (i.e. resource elements of k=0, 1, 6, 7 and l=9, 10), and a fifth group includes resource elements to which a 3rd, 4th, 9th and 10th subcarriers in the frequency domain and a 13th and 14th OFDM symbols in the time domain correspond (i.e. resource elements of k=2, 3, 8, 9 and l=12, 13).

Embodiment 1: selecting two groups of resource elements from the five groups of resource elements of a resource block, so as to constitute the patterns of the CSI-RSs of the 16 antenna ports.

Figure 6:
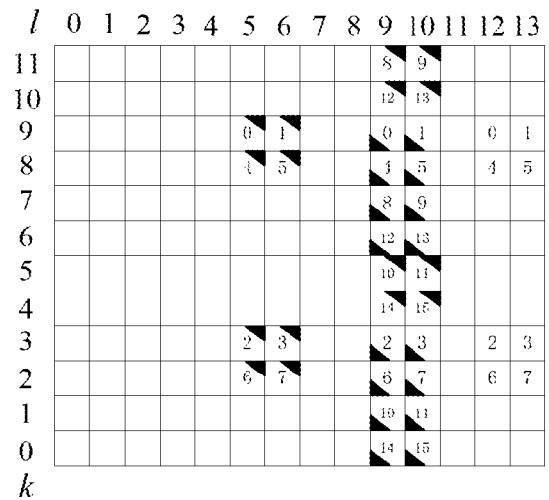
FIG. 6 shows designed patterns of channel state information reference signals in normal cyclic prefix subframes according to an embodiment of the present disclosure.

Theoretically, any two of the five groups of resource elements may constitute the patterns of the CSI-RSs of the 16 antenna ports for transmitting the CSI-RSs of the 16 antenna ports. Taking into account that CSI-RSs used by different cells are made interleaved as possible so as to ensure channel measurement quality of edge users, multiple patterns of CSI-RSs need to be designed for use by multiple cells. A relatively concise method is to combine patterns of CSI-RSs of two consecutive 8 antenna ports (in an order of time domain first and then frequency domain) into patterns of CSI-RSs of 16 antenna ports, as shown in FIG. 6; wherein the above five groups of resource elements may be included in one resource block, or a first group and a second group of resource elements may be combined to constitute a group of resource elements, or a third group and a fourth group of resource elements may be combined to constitute another group of resource elements, thus, these two groups of resource elements may be used respectively to realize transmission of CSI-RSs of 16 antenna ports, including:

in each of the resource blocks, selecting resource elements located at a 3rd, 4th, 9th and 10th subcarriers in the frequency domain and at a 6th and 7th OFDM symbols in the time domain, and resource elements located at a 5th, 6th, 11th and 12th subcarriers in the frequency domain and at a 10th and 11th OFDM symbols in the time domain, so as to constitute the resource element group, or selecting resource elements located at a 1st, 2nd, 3rd, 4th, 7th, 8th, 9th and 10th subcarriers in the frequency domain and at a 10th and 11th OFDM symbols in the time domain, so as to constitute the resource element group.

Figure 7:
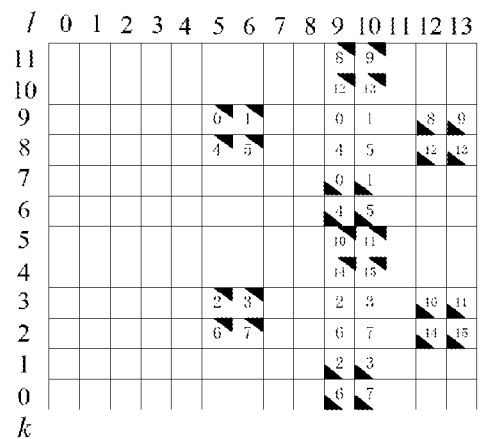
FIG. 7 shows designed patterns of channel state information reference signals in normal cyclic prefix subframes according to an embodiment of the present disclosure.

In another case, in order to obtain a relatively good estimated performance of a channel, the resource elements to which the CSI-RSs of 16 antenna ports correspond may be uniformly distributed in a resource block, as shown in FIG. 7; a first group and a second group of resource elements may be combined to constitute a resource element group, or a fourth group and a fifth group of resource elements may be combined to constitute another resource element group, thus, these two resource element groups may be used respectively to realize transmission of CSI-RSs of 16 antenna ports, including:

selecting resource elements located at a 3rd, 4th, 9th and 10th subcarriers in the frequency domain and at a 6th and 7th OFDM symbols in the time domain in the first resource block, and a 5th, 6th, 11th and 12th subcarriers in the frequency domain and at a 10th and 11th OFDM symbols in the time domain in the second resource block, so as to constitute the resource element group, or selecting resource elements located at a 1st, 2nd, 7th and 8th subcarriers in the frequency domain and at a 10th and 11th OFDM symbols in the time domain in the first resource block, and a 3rd, 4th, 9th and 10th subcarriers in the frequency domain and at a 13th and 14th OFDM symbols in the time domain in the second resource block, so as to constitute the resource element group.

Embodiment 2: selecting one group of resource elements from five groups of resource elements of a first resource block, and selecting one group of resource elements from five groups of resource elements of a second resource block, so as to constitute the patterns of the CSI-RSs of the 16 antenna ports; wherein the first resource block and the second resource block are located at different subframes of time domain.

Such a manner is referred to as "time domain binding", which means that two different resource blocks of time domain are used to constitute patterns of CSI-RSs of 16 antenna ports. Theoretically, any two different resource blocks of time domain are used for constitution; however, in order to obtain relatively good estimated quality of a channel, two resource blocks of time domain as adjacent as possible are used for constitution.

Figure 8A:
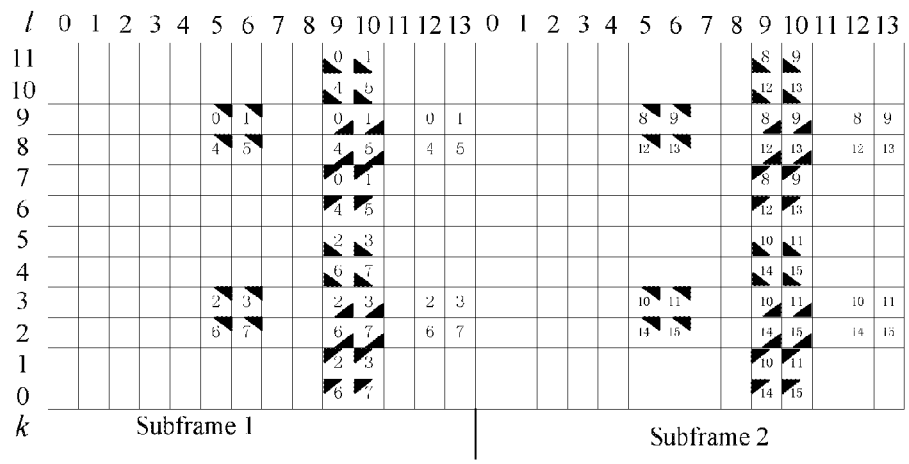
FIGS. 8A and 8B show designed patterns of channel state information reference signals in normal cyclic prefix subframes according to an embodiment of the present disclosure.

In a particular manner of time domain binding, CSI-RSs of two 8 antenna ports at two subframes of the same position may be combined into CSI-RSs of 16 antenna ports, as shown in FIG. 8A; it is assumed that the left one is a subframe 1, and the right one is a subframe 2, and five groups of resource elements may be obtained by combining resource elements in the same groups in the subframe 1 and subframe 2 (for example, resource elements in a first group in the subframe 1 and resource elements in a first group in the subframe 2 may constitute a resource element group, and so on, for constituting five resource element groups), and the five resource element groups may be used respectively to realize the transmission of the CSI-RSs of the 16 antenna ports, a particular manner of constitution including:

selecting resource elements located at a 3rd, 4th, 9th and 10th subcarriers in the frequency domain and at a 6th and 7th OFDM symbols in the time domain in the first resource block (such as the subframe 1 in FIG. 8A, the same below), and a 3rd, 4th, 9th and 10th subcarriers in the frequency domain and at a 6th and 7th OFDM symbols in the time domain in the second resource block (such as the subframe 2 in FIG. 8A, the same below), so as to constitute the resource element group, or selecting resource elements located at a 5th, 6th, 11th and 12th subcarriers in the frequency domain and at a 10th and 11th OFDM symbols in the time domain in the first resource block, and a 5th, 6th, 11th and 12th subcarriers in the frequency domain and at a 10th and 11th OFDM symbols in the time domain in the second resource block, so as to constitute the resource element group, or selecting resource elements located at a 3rd, 4th, 9th and 10th subcarriers in the frequency domain and at a 10th and 11th OFDM symbols in the time domain in the first resource block, and a 3rd, 4th, 9th and 10th subcarriers in the frequency domain and at a 10th and 11th OFDM symbols in the time domain in the second resource block, so as to constitute the resource element group, or selecting resource elements located at a 1st, 2nd, 7th and 8th subcarriers in the frequency domain and at a 10th and 11th OFDM symbols in the time domain in the first resource block, and a 1st, 2nd, 7th and 8th subcarriers in the frequency domain and at a 10th and 11th OFDM symbols in the time domain in the second resource block, so as to constitute the resource element group, or selecting resource elements located at a 3rd, 4th, 9th and 10th subcarriers in the frequency domain and at a 13th and 14th OFDM symbols in the time domain in the first resource block, and a 3rd, 4th, 9th and 10th subcarriers in the frequency domain and at a 13th and 14th symbols in the time domain in the second resource block, so as to constitute the resource element group.

Figure 8B:
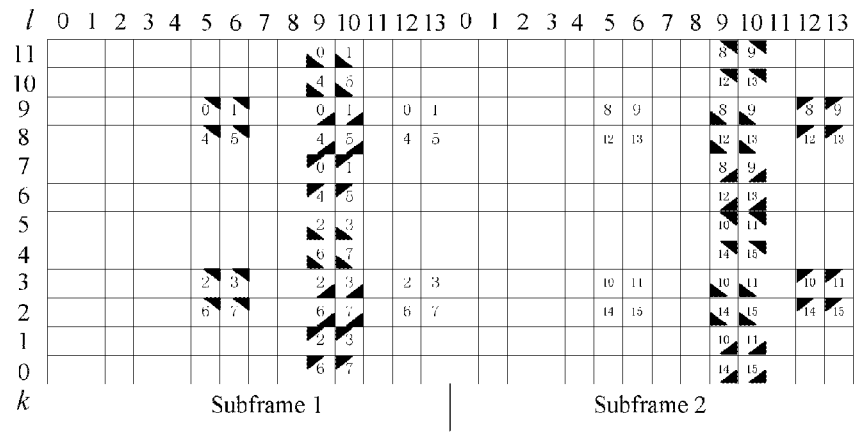

In another case, in order to obtain a relatively good estimated performance of a channel, the resource elements to which the CSI-RSs of 16 antenna ports correspond may be uniformly distributed in two resource blocks, as shown in FIG. 8B; a first group of resource elements in a first resource block and a second group of resource elements in a second resource block may be combined, or a second group of resource elements in the first resource block and a third group of resource elements in the second resource block may be combined, or a third group of resource elements in the first resource block and a fourth group of resource elements in the second resource block may be combined, or a fourth group of resource elements in the first resource block and a fifth group of resource elements in the second resource block may be combined, or a fifth group of resource elements in the first resource block and a first group of resource elements in the second resource block may be combined, and these five groups of resource elements may be used respectively to realize transmission of the CSI-RSs of the 16 antenna ports, a particular manner of constitution including:

selecting resource elements located at a 3rd, 4th, 9th and 10th subcarriers in the frequency domain and at a 6th and 7th OFDM symbols in the time domain in the first resource block, and a 5th, 6th, 11th and 12th subcarriers in the frequency domain and at a 10th and 11th OFDM symbols in the time domain in the second resource block, so as to constitute the resource element group, or selecting resource elements located at a 5th, 6th, 11th and 12th subcarriers in the frequency domain and at a 10th and 11th OFDM symbols in the time domain in the first resource block, and a 3rd, 4th, 9th and 10th subcarriers in the frequency domain and at a 10th and 11th OFDM symbols in the time domain in the second resource block, so as to constitute the resource element group, or selecting resource elements located at a 3rd, 4th, 9th and 10th subcarriers in the frequency domain and at a 10th and 11th OFDM symbols in the time domain in the first resource block, and a 1st, 2nd, 7th and 8th subcarriers in the frequency domain and at a 10th and 11th OFDM symbols in the time domain in the second resource block, so as to constitute the resource element group, or selecting resource elements located at a 1st, 2nd, 7th and 8th subcarriers in the frequency domain and at a 10th and 11th OFDM symbols in the time domain in the first resource block, and a 3rd, 4th, 9th and 10th subcarriers in the frequency domain and at a 13th and 14th OFDM symbols in the time domain in the second resource block, so as to constitute the resource element group, or selecting resource elements located at a 3rd, 4th, 9th and 10th subcarriers in the frequency domain and at a 13th and 14th OFDM symbols in the time domain in the first resource block, and a 3rd, 4th, 9th and 10th subcarriers in the frequency domain and at a 6th and 7th OFDM symbols in the time domain in the second resource block, so as to constitute the resource element group.

Furthermore, as CSI-RSs need to be transmitted at a period configured by the system and a fixed offset (as shown in Table 1), when the CSI-RSs of the 16 antenna ports are constituted in the manner of "time domain binding", a relationship between the first resource block and the second resource block needs to be defined, which includes two manners:

the first one is an implied manner, in which a relationship between two subframes (the first resource block and the second resource block) is provided definitely in the standards; according to provision in the standards, a defining method using combined period and offset identical to that in R10 (that is, existing provisions of CSI-RSs of 8 antenna ports are followed) will be used for the first subframe, and the rules defined in the standards will be used for the relationship between the second subframe and the first subframe, such as two consecutive subframes;

and the second one is an explicit manner, in which when a defining method using combined period and offset identical to that in R10 is used for the first subframe, a piece of signaling needs to be added in the standards for indicating a period and an offset of the second subframe; especially, if the periods of the two subframes are identical, only an offset of one subframe needs to be added for indication, taking into account that offsets of subframes of the two groups of antenna ports are relatively small; in particular when the above newly-added signaling is transmitted, an RRC (radio resource control) protocol may be employed for the transmission.

Embodiment 3: selecting one group of resource elements from five groups of resource elements of the first resource block, and selecting one group of resource elements from five groups of resource elements of the second resource block, so as to constitute the patterns of the CSI-RSs of the 16 antenna ports; the first resource block and the second resource block are located at different subframes of frequency domain.

Such a manner is referred to as "frequency domain binding", which means that two different resource blocks of frequency domain are used to constitute patterns of CSI-RSs of 16 antenna ports. Theoretically, any two different resource blocks of frequency domain are used for constitution; however, in order to obtain relatively good estimated quality of a channel, two resource blocks of frequency domain as adjacent as possible are used for constitution. It should be noted that LTE R10/11 systems use full bands to transmit CSI-RSs, and after the CSI-RSs designed by using the manner of "frequency domain binding", only part of the bands is needed for the transmission, thereby lowering occupation of the bands.

Figure 9:
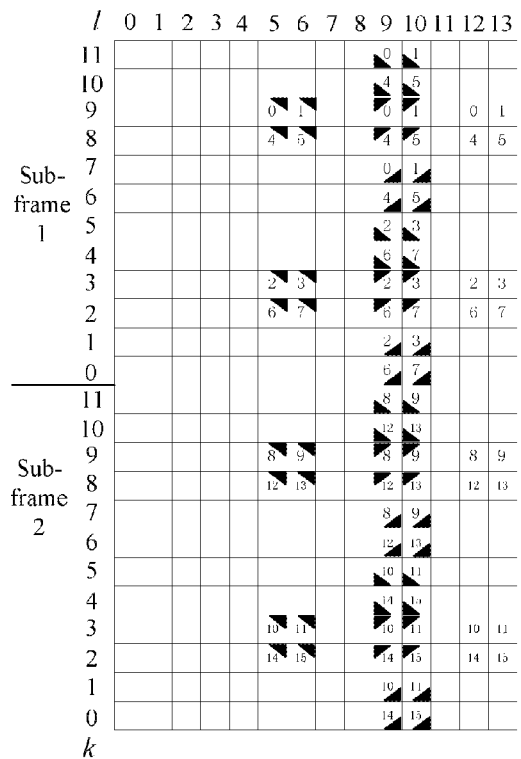
FIG. 9 shows designed patterns of channel state information reference signals in normal cyclic prefix subframes according to an embodiment of the present disclosure.

In a particular manner of frequency domain binding, CSI-RSs of two 8 antenna ports at two subframes of the same position may be combined into CSI-RSs of 16 antenna ports, as shown in FIG. 9; it is assumed that the upper one is a subframe 1, and the lower one is a subframe 2, and five resource element groups may be obtained by combining resource elements in the same groups in the subframe 1 and subframe 2 (for example, resource elements in a first group in the subframe 1 and resource elements in a first group in the subframe 2 may constitute a resource element group, and so on, for constituting five resource element groups), and the five resource element groups may be used respectively to realize the transmission of the CSI-RSs of the 16 antenna ports, a particular manner of constitution including:

selecting resource elements located at a 3rd, 4th, 9th and 10th subcarriers in the frequency domain and at a 6th and 7th OFDM symbols in the time domain in the first resource block (such as the subframe 1 in FIG. 9, the same below), and a 3rd, 4th, 9th and 10th subcarriers in the frequency domain and at a 6th and 7th OFDM symbols in the time domain in the second resource block (such as the subframe 2 in FIG. 9, the same below), so as to constitute the resource element group, or selecting resource elements located at a 5th, 6th, 11th and 12th subcarriers in the frequency domain and at a 10th and 11th OFDM symbols in the time domain in the first resource block, and a 5th, 6th, 11th and 12th subcarriers in the frequency domain and at a 10th and 11th OFDM symbols in the time domain in the second resource block, so as to constitute the resource element group, or selecting resource elements located at a 3rd, 4th, 9th and 10th subcarriers in the frequency domain and at a 10th and 11th OFDM symbols in the time domain in the first resource block, and a 3rd, 4th, 9th and 10th subcarriers in the frequency domain and at a 10th and 11th OFDM symbols in the time domain in the second resource block, so as to constitute the resource element group, or selecting resource elements located at a 1st, 2nd, 7th and 8th subcarriers in the frequency domain and at a 10th and 11th OFDM symbols in the time domain in the first resource block, and a 1st, 2nd, 7th and 8th subcarriers in the frequency domain and at a 10th and 11th OFDM symbols in the time domain in the second resource block, so as to constitute the resource element group, or selecting resource elements located at a 3rd, 4th, 9th and 10th subcarriers in the frequency domain and at a 13th and 14th OFDM symbols in the time domain in the first resource block, and a 3rd, 4th, 9th and 10th subcarriers in the frequency domain and at a 13th and 14th OFDM symbols in the time domain in the second resource block, so as to constitute the resource element group.

Furthermore, as CSI-RSs need to be transmitted at a period configured by the system and a fixed offset as shown in Table 1, when the CSI-RSs of the 16 antenna ports are constituted in the manner of "frequency domain binding", similar to the manner of "time domain binding", a relationship between the first resource block and the second resource block needs also to be defined, which includes two manners:

the first one is an implied manner, in which a relationship between two subframes (the first resource block and the second resource block) is provided definitely in the standards; according to provision in the standards, a defining method using combined period and offset identical to that in R10 (that is, existing provisions of CSI-RSs of 8 antenna ports are followed) will be used for the first subframe, and the rules defined in the standards will be used for the relationship between the second subframe and the first subframe;

and the second one is an explicit manner, in which when a defining method using combined period and offset identical to that in R10 is used for the first subframe, a piece of signaling needs to be added in the standards for indicating a period and an offset of the second subframe; for example, a previous group of resource elements in CSI-RSs appears in a resource block of an offset m in M resource blocks, and a latter group of resource elements in CSI-RSs appears in a resource block of an offset n in N resource blocks; in particular when the above newly-added signaling is transmitted, an RRC (radio resource control) protocol may be employed for the transmission.

Embodiment 4: selecting two groups of resource elements from five groups of resource elements and other newly-added resource elements of a resource block, so as to constitute the patterns of the CSI-RSs of the 16 antenna ports.

If effect on previous users is loosened in designing CSI-RSs of 16 ports, some resource positions may be added properly. Taking into account that along with introduction of enhanced control channels (E-PDCCHs), control channels (PDCCHs) of some subframes may be controlled within two OFDM symbols, resource elements of under other OFDM symbols may used for transmitting the CSI-RSs, detailed patterns being shown in FIG. 10. Wherein, the resource elements in the shadowed part are the newly-added resource elements of the present disclosure, including all the resource elements located at a 3rd and 4th OFDM symbols in a time domain, and resource elements located at a 5th and 8th subframes in a frequency domain and at a 6th, 7th, 13th and 14th OFDM symbols in the time domain.

Figures 10, 11:
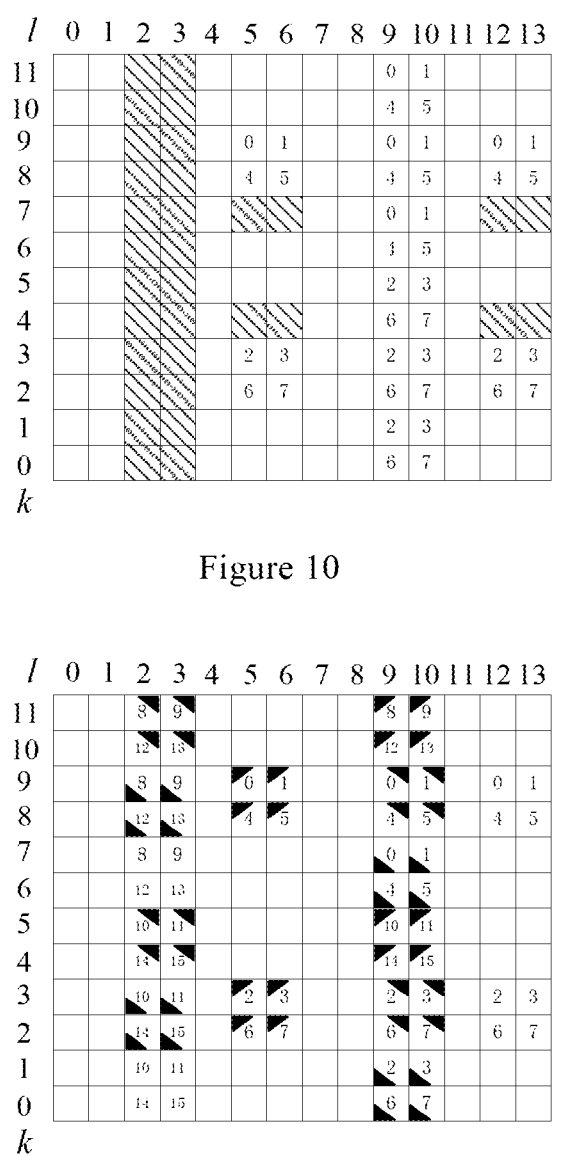

Using these newly-added resource elements and the original existing five groups of resource elements to transmit the designed patterns of the CSI-RSs of the 16 antenna ports is shown in FIG. 11:

in each of the resource blocks, selecting resource elements located at a 5th, 6th, 11th and 12th subcarriers in the frequency domain and at a 3rd and 4th OFDM symbols in the time domain, and at a 3rd, 4th, 9th and 10th subcarriers in the frequency domain and at a 10th and 11th OFDM symbols in the time domain, so as to constitute the resource element group, or in each of the resource blocks, selecting resource elements located at a 3rd, 4th, 9th and 10th subcarriers in the frequency domain and at a 3rd and 4th OFDM symbols in the time domain, and at a 1st, 2nd, 7th and 8th subcarriers in the frequency domain and at a 10th and 11th OFDM symbols in the time domain, so as to constitute the resource element group, or in each of the resource blocks, selecting resource elements located at a 1st, 2nd, 7th and 8th subcarriers in the frequency domain and at a 3rd and 4th OFDM symbols in the time domain, and at a 3rd, 4th, 9th and 10th subcarriers in the frequency domain and at an 13th and 14th OFDM symbols in the time domain, so as to constitute the resource element group, or in each of the resource blocks, selecting resource elements located at a 3rd, 4th, 9th and 10th subcarriers in the frequency domain and at a 6th and 7th OFDM symbols in the time domain, and at a 5th, 6th, 11th and 12th subcarriers in the frequency domain and at an 10th and 11th OFDM symbols in the time domain, so as to constitute the resource element group.

Extended Cyclic Prefix Subframes

FIG. 4(c) shows a schematic diagram of a structure of a resource block; wherein 12 subcarriers numbered k=0-11 in turn in a frequency domain and 12 OFDM symbols numbered 1=0-11 in turn in a time domain are included, and resource elements occupied by CSI-RSs of 8 antenna ports may be divided into four groups: a first group includes resource elements to which a 3rd, 4th, 9th and 12th subcarriers in the frequency domain and a 5th and 6th OFDM symbols in the time domain correspond (i.e. resource elements of k=2, 5, 8, 11 and 1=4, 5), a second group includes resource elements to which a 1st, 4th, 7th and 10th subcarriers in the frequency domain and a 5th and 6th OFDM symbols in the time domain correspond (i.e. resource elements of k=0, 3, 6, 9 and 1=4, 5), a third group includes resource elements to which a 2nd, 5th, 8th and 11th subcarriers in the frequency domain and an 11th and 12th OFDM symbols in the time domain correspond (i.e. resource elements of k=1, 4, 7, 10 and 1=10, 11), a fourth group includes resource elements to which a 1st, 4th, 7th and 10th subcarriers in the frequency domain and an 11th and 12th OFDM symbols in the time domain correspond (i.e. resource elements of k=0, 3, 6, 9 and 1=10, 11).

Embodiment 1: selecting two groups of resource elements from the four groups of resource elements of a resource block, so as to constitute the patterns of the CSI-RSs of the 16 antenna ports.

Theoretically, any two of the four groups of resource elements may constitute the patterns of the CSI-RSs of the 16 antenna ports for transmitting the CSI-RSs of the 16 antenna ports. Taking into account that CSI-RSs used by different cells are made interleaved as possible so as to ensure channel measurement quality of edge users, multiple patterns of CSI-RSs need to be designed for use by multiple cells. A relatively concise method is to combine patterns of CSI-RSs of two consecutive 8 antenna ports (in an order of time domain first and then frequency domain) into patterns of CSI-RSs of 16 antenna ports, as shown in FIG. 12; the above four groups of resource elements may be included in one resource block, or a first group and a second group of resource elements may be combined to constitute a resource element group, or a third group and a fourth group of resource elements may be combined to constitute another resource element group, thus, these two resource element groups may be used respectively to realize transmission of CSI-RSs of 16 antenna ports, including:

in each of the resource blocks, selecting resource elements located at a 1st, 3rd, 4th, 6th, 7th, 9th, 10th and 12th subcarriers in the frequency domain and at a 5th and 6th OFDM symbols in the time domain, so as to constitute the resource element group, or selecting resource elements located at a 1st, 2nd, 4th, 5th, 7th, 8th, 10th and 11th subcarriers in the frequency domain and at an 11th and 12th OFDM symbols in the time domain, so as to constitute the resource element group.

Figures 12, 13A:
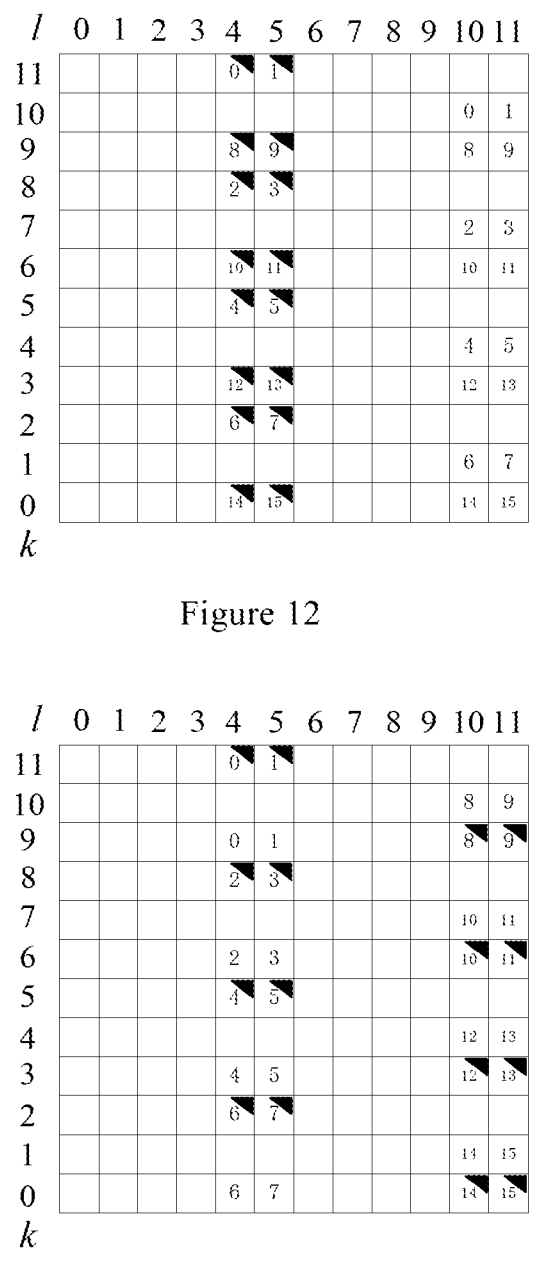

In another case, in order to obtain a relatively good estimated performance of a channel, the resource elements to which the CSI-RSs of 16 antenna ports correspond may be uniformly distributed in a resource block, as shown in FIG. 13A; a first group and a fourth group of resource elements may be combined to constitute a resource element group, or a second group and a third group of resource elements may be combined to constitute another resource element group, thus, these two resource element groups may be used respectively to realize transmission of CSI-RSs of 16 antenna ports, including:

in each of the resource blocks, selecting resource elements located at a 3rd, 6th, 9th and 12th subcarriers in the frequency domain and at a 5th and 6th OFDM symbols in the time domain, and a 1st, 4th, 7th, and 10th subcarriers in the frequency domain and at an 11th and 12th OFDM symbols in the time domain, so as to constitute the resource element group, or selecting resource elements located at a 1st, 4th, 7th, and 10th subcarriers in the frequency domain and at a 5th and 6th OFDM symbols in the time domain, and at 2nd, 5th, 8th and 11th subcarriers in the frequency domain and at an 11th and 12th OFDM symbols in the time domain, so as to constitute the resource element group.

Figures 13B, 14:
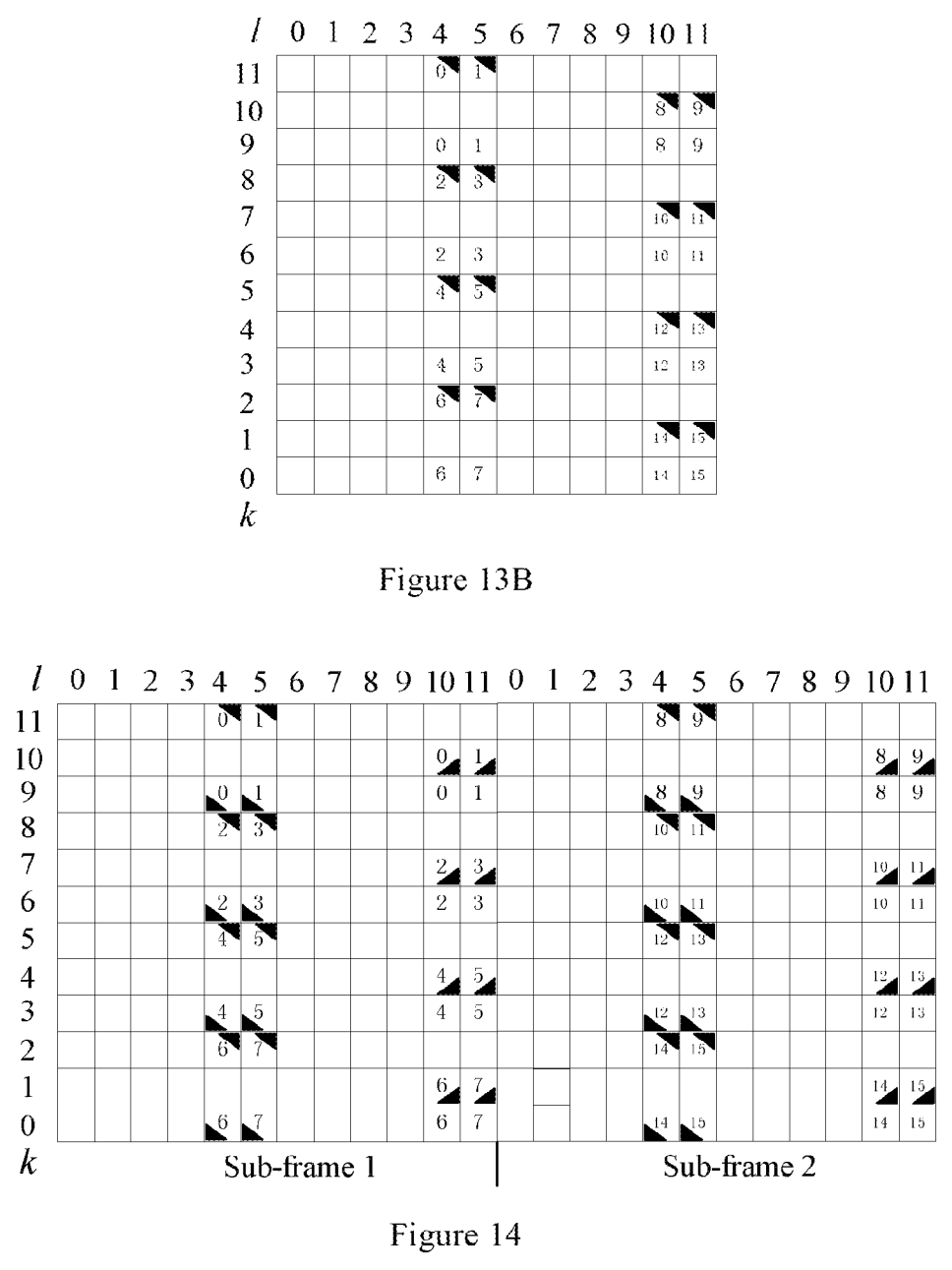

In a further case, as shown in FIG. 13B, a first group and a third group of resource elements may be combined to constitute a resource element group, or a second group and a fourth group of resource elements may be combined to constitute another resource element group, thus, these two groups of resource elements may be used respectively to realize transmission of CSI-RSs of 16 antenna ports, including:

in each of the resource blocks, selecting resource elements located at a 3rd, 6th, 9th and 12th subcarriers in the frequency domain and at a 5th and 6th OFDM symbols in the time domain, and a 2nd, 5th, 8th, and 11th subcarriers in the frequency domain and at an 11th and 12th OFDM symbols in the time domain, so as to constitute the resource element group, or selecting resource elements located at a 1st, 4th, 7th, and 10th subcarriers in the frequency domain and at a 5th and 6th OFDM symbols in the time domain, and at 1st, 4th, 7th, and 10th subcarriers in the frequency domain and at an 11th and 12th OFDM symbols in the time domain, so as to constitute the resource element group.

Embodiment 2: selecting one group of resource elements from four groups of resource elements of a first resource block, and selecting one group of resource elements from four groups of resource elements of a second resource block, so as to constitute the patterns of the CSI-RSs of the 16 antenna ports; wherein the first resource block and the second resource block are located at different subframes of time domain.

Such a manner also belongs to "time domain binding", which means that theoretically; however, in order to obtain relatively good estimated quality of a channel, two resource blocks of time domain as adjacent as possible are used for constitution.

In a particular manner of time domain binding, CSI-RSs of two 8 antenna ports at two subframes of the same position may be combined into CSI-RSs of 16 antenna ports, as shown in FIG. 14; wherein it is assumed that the left one is a subframe 1, and the right one is a subframe 2, and four groups of resource elements may be obtained by combining resource elements in the same groups in the subframe 1 and subframe 2 (for example, resource elements in a first group in the subframe 1 and resource elements in a first group in the subframe 2 may constitute a group of resource elements, and so on, for constituting four resource element groups), and the four resource element groups may be used respectively to realize the transmission of the CSI-RSs of the 16 antenna ports, a particular manner of constitution including:

selecting resource elements located at a 3rd, 6th, 9th and 12th subcarriers in the frequency domain and at a 5th and 6th OFDM symbols in the time domain in the first resource block (such as the subframe 1 in FIG. 14, the same below), and a 3rd, 6th, 9th and 12th subcarriers in the frequency domain and at a 5th and 6th OFDM symbols in the time domain in the second resource block (such as the subframe 2 in FIG. 14, the same below), so as to constitute the resource element group, or selecting resource elements located at a 1st, 4th, 7th and 10th subcarriers in the frequency domain and at a 5th and 6th OFDM symbols in the time domain in the first resource block, and a 1st, 4th, 7th and 10th subcarriers in the frequency domain and at a 5th and 6th OFDM symbols in the time domain in the second resource block, so as to constitute the resource element group, or selecting resource elements located at a 2nd, 5th, 8th and 11th subcarriers in the frequency domain and at a 11th and 12th OFDM symbols in the time domain in the first resource block, and a 2nd, 5th, 8th and 11th subcarriers in the frequency domain and at a 11th and 12th OFDM symbols in the time domain in the second resource block, so as to constitute the resource element group, or selecting resource elements located at a 1st, 4th, 7th and 10th subcarriers in the frequency domain and at an 11th and 12th OFDM symbols in the time domain in the first resource block, and a 1st, 4th, 7th and 10th subcarriers in the frequency domain and at an 11th and 12th OFDM symbols in the time domain in the second resource block, so as to constitute the resource element group.

Likewise, in an extended cyclic prefix system, in constituting the CSI-RSs of the 16 antenna ports by using "time domain binding", a relationship between the first resource block and the second resource block needs to be defined, with a detailed manner being the same as that in a normal cyclic prefix system, which also includes an implied manner and an explicit manner, and shall not be described herein any further.

Embodiment 3: selecting one group of resource elements from four groups of resource elements of the first resource block, and selecting one group of resource elements from four groups of resource elements of the second resource block, so as to constitute the patterns of the CSI-RSs of the 16 antenna ports; the first resource block and the second resource block are located at different subcarriers of frequency domain.

Such a manner also belongs to "frequency domain binding", which means that theoretically, any two different resource blocks of frequency domain are used to constitute patterns of CSI-RSs of 16 antenna ports; however, in order to obtain relatively good estimated quality of a channel, two resource blocks of frequency domain as adjacent as possible are used for constitution.

Figure 15:
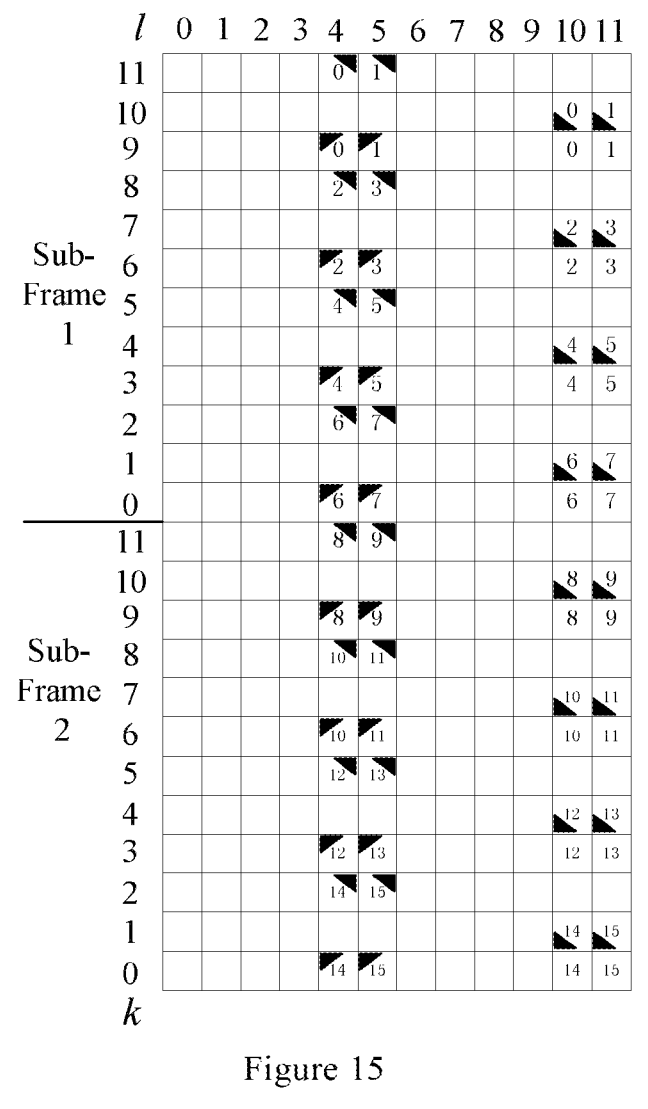

In a particular manner of frequency domain binding, CSI-RSs of two 8 antenna ports at two subframes of the same position may be combined into CSI-RSs of 16 antenna ports, as shown in FIG. 15; it is assumed that the upper one is a subframe 1, and the lower one is a subframe 2, and four resource element groups may be obtained by combining resource elements in the same groups in the subframe 1 and subframe 2(for example, resource elements in a first group in the subframe 1 and resource elements in a first group in the subframe 2 may constitute a resource element group, and so on, for constituting four resource element groups), and the four resource element groups may be used respectively to realize the transmission of the CSI-RSs of the 16 antenna ports, a particular manner of constitution including:

selecting resource elements located at a 3rd, 6th, 9th and 12th subcarriers in the frequency domain and at a 5th and 6th OFDM symbols in the time domain in the first resource block (such as the subframe 1 in FIG. 15, the same below), and a 3rd, 6th, 9th and 12th subcarriers in the frequency domain and at a 5th and 6th OFDM symbols in the time domain in the second resource block (such as the subframe 2 in FIG. 15, the same below), so as to constitute the resource element group, or selecting resource elements located at a 1st, 4th, 7th and 10th subcarriers in the frequency domain and at an 11th and 12th OFDM symbols in the time domain in the first resource block, and a 1st, 4th, 7th and 10th subcarriers in the frequency domain and at an 11th and 12th OFDM symbols in the time domain in the second resource block, so as to constitute the resource element group, or selecting resource elements located at a 2nd, 5th, 8th and 11th subcarriers in the frequency domain and at an 11th and 12th OFDM symbols in the time domain in the first resource block, and a 2nd, 5th, 8th and 11th subcarriers in the frequency domain and at an 11th and 12th OFDM symbols in the time domain in the second resource block, so as to constitute the resource element group, or selecting resource elements located at a 1st, 4th, 7th and 10th subcarriers in the frequency domain and at an 11th and 12th OFDM symbols in the time domain in the first resource block, and a 1st, 4th, 7th and 10th subcarriers in the frequency domain and at an 11th and 12th OFDM symbols in the time domain in the second resource block, so as to constitute the resource element group.

Likewise, in an extended cyclic prefix system, in constituting the CSI-RSs of the 16 antenna ports by using "frequency domain binding", a relationship between the first resource block and the second resource block needs to be defined, with a detailed manner being the same as that in a normal cyclic prefix system, which also includes an implied manner and an explicit manner, and shall not be described herein any further.

Embodiment 4: selecting two groups of resource elements from four groups of resource elements and other newly-added resource elements of a resource block, so as to constitute the patterns of the CSI-RSs of the 16 antenna ports.

Figures 16, 17:
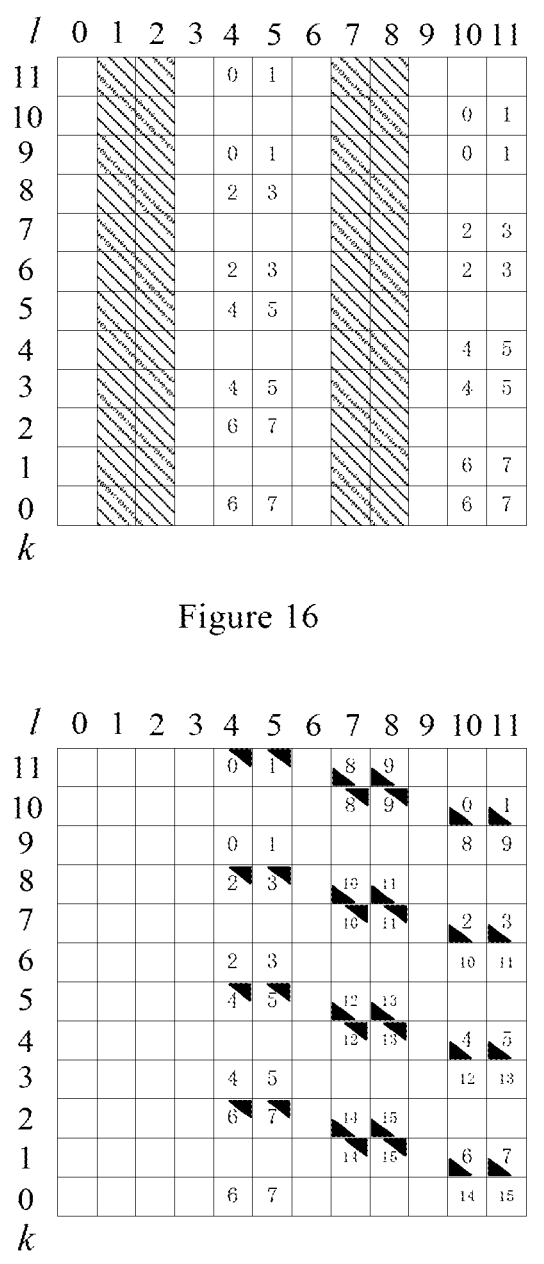

If effect on previous users is loosened in designing CSI-RSs of 16 ports, some resource positions may be added properly, detailed patterns being shown in FIG. 16. The resource elements in the shadowed part are the newly-added resource elements of the present disclosure, including all the resource elements located at a 2nd, 3rd, 8th and 9th OFDM symbols in the time domain.

Using these newly-added resource elements and the original existing four groups of resource elements to transmit the designed patterns of the CSI-RSs of the 16 antenna ports is shown in FIG. 17:

in each of the resource blocks, selecting resource elements located at a 3rd, 6th, 9th and 12th subcarriers in the frequency domain and at a 5th and 6th OFDM symbols in the time domain, and at a 2nd, 5th, 8th and 11th subcarriers in the frequency domain and at an 8th and 9th OFDM symbols in the time domain, so as to constitute the resource element group, or in each of the resource blocks, selecting resource elements located at a 1st, 4th, 7th and 10th subcarriers in the frequency domain and at a 5th, 6th, 11th and 12th OFDM symbols in the time domain, so as to constitute the resource element group, or in each of the resource blocks, selecting resource elements located at a 3rd, 6th, 9th and 12th subcarriers in the frequency domain and at an 8th and 9th OFDM symbols in the time domain, and at a 2nd, 5th, 8th and 11th subcarriers in the frequency domain and at an 11th and 12th OFDM symbols in the time domain, so as to constitute the resource element group.

Figure 18:
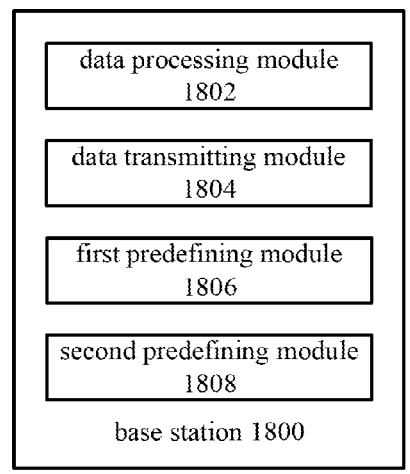
FIG. 18 shows designed patterns of channel state information reference signals in extended cyclic prefix subframes according to an embodiment of the present disclosure.

Corresponding to the steps shown FIG. 5, a structure of a corresponding base station is shown in FIG. 18. The base station 1800 includes: a data processing module 1802 configured to select s groups of resource elements from a resource block, an $A_i$-th group of resource elements being used for transmitting resource elements of channel state information reference signals of $m_i$ antenna ports, so as to constitute a resource element group to which channel state information reference signals of n antenna ports correspond; where, $s>1$, $n>m_i$, $1 \le i \le s$; or in r resource blocks, select at least one resource element from an $A_j$-th resource block for transmitting channel state information reference signals of $m_j$ antenna ports, and constitute a resource element group to which channel state information reference signals of n antenna ports correspond by using all the selected resource elements; where, $r>1$, $n>m_j$, $1 \le j \le r$; and a data transmitting module 1804 configured to transmit the channel state information reference signals of the n antenna ports to one or more terminals by using the resource element group. In such a technical solution, as resource elements in each resource block for transmitting CSI-RSs of 2, 4 or 8 antenna ports, are defined in existing standards, groups of resource elements for transmitting CSI-RSs of more antenna ports may be obtained in a combined manner by selecting resource elements originally used for transmitting CSI-RSs of 2, 4 or 8 antenna ports from one or more resource blocks, thereby facilitating fully bringing performance of a large-scale antenna system into play, and further acquiring a system capacity gain brought by a large amount of antennas. And at the same time, as the resource elements originally used for transmitting CSI-RSs of 2, 4 or 8 antenna ports are used, the number of transmission antenna ports supported by the CSI-RSs is extended, while reducing influence on previous users as possible.

For example, when the groups of resource elements are from the one resource block, the data transmitting module 1804 further transmits indication signaling to the terminal, the indication signaling including first joint signaling and s pieces of first configuration signaling corresponding to the s groups of resource elements; the first joint signaling includes a numerical value of a total number n of the antenna ports, a periodicity of the resource block in a time domain and its offset in the time domain periodicity, and a power ratio $\gamma_i$ of assumed data channel transmission in feeding back channel state information by the terminal; and the first configuration signaling corresponding to the $A_i$-th group of resource elements includes a number $m_i$ of antenna ports and a position of the $A_i$ group of resource elements in the resource block.

For example, when the groups of resource elements are from the r resource blocks, the data transmitting module 1804 further transmits indication signaling to the terminal, the indication signaling including second joint signaling and r pieces of second configuration signaling corresponding to the r resource blocks; the second joint signaling includes a numerical value of a total number n of the antenna ports, and the second configuration signaling corresponding to the $A_j$-th resource block includes a numerical value of a number $m_j$ of antenna ports, information on positions of selected resource elements in the $A_j$-th resource block, information on a position of the $A_j$-th resource block, and a power ratio $\gamma_j$ of assumed data channel transmission in feeding back channel state information by the terminal.

For example, when the r resource blocks are located in different subframes of time domain, the information on a position of the $A_j$-th resource block includes periodicity information and offset information, the periodicity information being used for indicating a periodicity of the $A_j$-th resource block in a time domain, and the offset information being used for indicating an offset of the $A_j$-th resource block in a time domain periodicity; or when the r resource blocks are located in different subcarriers of frequency domain, the information on a position of the $A_j$-th resource block includes time domain information and frequency domain information, the time domain information being used for indicating a periodicity and offset of the $A_j$-th resource block in a time domain, and the frequency domain information being used for indicating a periodicity and offset of the $A_j$-th resource block in a frequency domain.

For example, when the groups of resource elements are from the r resource blocks, the data transmitting module 1804 further transmits indication signaling to the terminal, the indication signaling including third joint signaling and r pieces of third configuration signaling corresponding to the r resource blocks; the third joint signaling includes a numerical value of a total number n of the antenna ports, information on a position of a designated resource block in the r resource blocks, information on a relative position between the $A_j$-th resource block and the designated resource block, and a power ratio $\gamma_j$ of assumed data channel transmission in feeding back channel state information by the terminal; and the third configuration signaling corresponding to the $A_j$-th resource block includes a numerical value of the number $m_j$ of antenna ports, and information on positions of selected resource elements in the $A_j$-th resource block.

For example, when the r resource blocks are located in different subframes of time domain, the information on a relative position includes offset information, the offset information being used for indicating an offset of the $A_j$-th resource block from the designated resource block in a time domain; or when the r resource blocks are located in different subcarriers of frequency domain, the third joint signaling further includes: a periodicity and offset of the r resource blocks in a time domain; and the information on a relative position includes offset information, the offset information being used for indicating an offset of the $A_j$-th resource block from the designated resource block in a frequency domain.

For example, the base station further includes a first predefining module 1806 configured to, when the r resource blocks are located in different subframes of time domain, predefine an offset of the r resource blocks in a time domain, or when the r resource blocks are located in different subcarriers of frequency domain, predefine an offset of the r resource blocks in a frequency domain; when the resource element group is from the r resource blocks, the data transmitting module further transmits indication signaling to the terminal, the indication signaling including: a numerical value of a number $m_j$ of antenna ports, a numerical value of a total number n of the antenna ports, information on a position of a designated resource block in the r resource elements in a time domain, and a power ratio $\gamma_j$ of assumed data channel transmission in feeding back channel state information by the terminal. In such a technical solution, definition of the periodicities and offsets the first resource block and the second resource block are realized in an "implied" manner, which refers to, in particular, when a position relationship between multiple resource blocks is written into a protocol, it is not needed to inform the terminal of related information by using signaling.

For example, the base station further includes a second predefining module 1808 configured to predefine positions of the selected resource elements in each resource block; when the resource element group is from the r resource blocks, the data transmitting module further transmits indication signaling to the terminal, the indication signaling including fourth joint signaling and r pieces of fourth configuration signaling corresponding to the r resource blocks; the fourth joint signaling includes a numerical value of a total number n of the antenna ports, and the fourth configuration signaling corresponding to the $A_j$-th resource block includes a numerical value of a number $m_j$ of antenna ports, information on the position of the $A_j$-th resource block, and a power ratio $\gamma_j$ of assumed data channel transmission in feeding back channel state information by the terminal; or the fourth joint signaling includes a numerical value of a total number n of the antenna ports, information on a position of a designated resource block in the r resource elements in a time domain, information on a relative position between the $A_j$-th resource block and the designated resource block, and a power ratio $\gamma_j$ of assumed data channel transmission in feeding back channel state information by the terminal; and the fourth configuration signaling corresponding to the $A_j$-th resource block includes a numerical value of the number $m_j$ of antenna ports. This technical solution refers to that when position information on the resource elements in the resource blocks is written into a protocol, it is not needed to inform the terminal of related information by using signaling.

For example, the data processing module 1802 selects two groups of resource elements from one or two resource blocks for transmitting channel state information reference signals of 8 antenna ports, the number of resource elements in each group being 8, so as to constitute a resource element group to which channel state information reference signals of 16 antenna ports correspond.

For example, in each of the resource blocks, the resource elements for transmitting channel state information reference signals of 8 antenna ports are configured into multiple groups; when the resource blocks are normal cyclic prefix subframes, the resource elements are configured into five groups, and when the resource blocks are extended cyclic prefix subframes, the resource elements are configured into four groups, and the data processing module 1802 is configured to: select two designated groups from multiple groups to which a resource block corresponds, or select a designated group from multiple groups to which a first resource block corresponds and a designated group from multiple groups to which a second resource block corresponds from the two resource blocks, so as to constitute the resource element group to which the channel state information reference signals of the 16 antenna ports correspond by using the two selected groups of resource elements; the first resource block and the second resource block are located at different subframes of time domain or are located at different subcarriers of frequency domain. In this technical solution, the resource element group to which the CSI-RSs of the 16 antenna ports are constructed by using existing CSI-RS resources, thereby reducing influence on users of previous releases as possible.

For example, when the first resource block and the second resource block are located at different subframes of time domain, if periodicities of the selected resource elements in the first resource block and the selected resource elements in the second resource block are identical, the indication signaling includes offset information, the offset information being used for indicating an offset between the selected resource elements in the first resource block and the selected resource elements in the second resource block in the time domain; and if periodicities of the selected resource elements in the first resource block and the selected resource elements in the second resource block are different, the indication signaling includes periodicity information and offset information, the periodicity information being used for indicating periodicities of the selected resource elements in the first resource block and the selected resource elements in the second resource block in the time domain, and the offset information being used for indicating an offset between the selected resource elements in the first resource block and the selected resource elements in the second resource block in the time domain; or when the first resource block and the second resource block are located at different subcarriers of frequency domain, the indication signaling includes periodicity information and offset information, the periodicity information being used for indicating periodicities of the selected resource elements in the first resource block and the selected resource elements in the second resource block in the frequency domain, and the offset information being used for indicating an offset between the selected resource elements in the first resource block and the selected resource elements in the second resource block in the frequency domain. In this technical solution, the periodicities and offsets between the first resource block and the second resource block are informed to the terminal in an "explicit" manner.

For example, the data transmitting module 1804 transmits the indication signaling by using a radio resource control (RRC) protocol.

For example, the data processing module 1802 selects other resource elements from each of the resource blocks than the resource elements for transmitting channel state information reference signals of 8 antenna ports, so as to constitute the resource element group by using the selected resource elements for transmitting channel state information reference signals of 8 antenna ports and/or the other resource elements.

Figure 19:
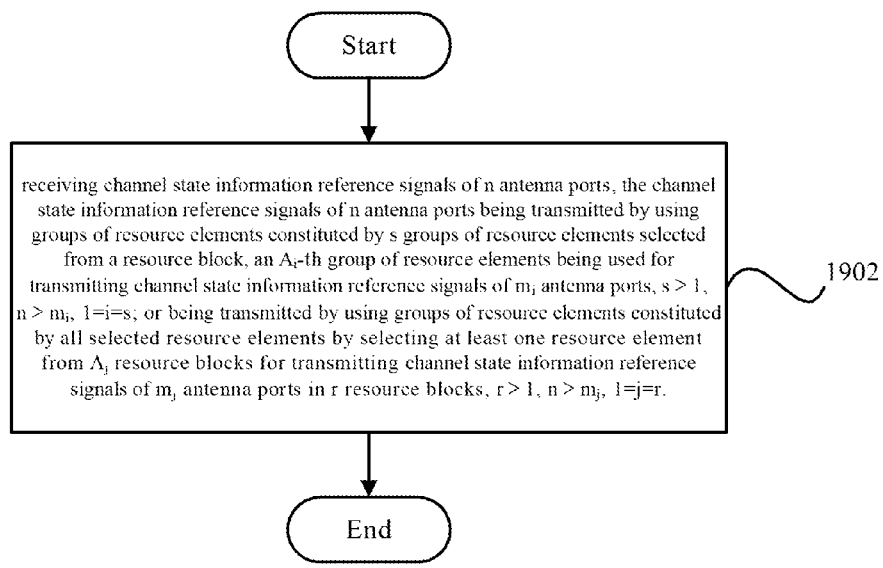
FIG. 19 shows a flowchart of receiving channel state information reference signals by a terminal according to an embodiment of the present disclosure.

Corresponding to the processing flows and the structure of the base station shown in FIGS. 5 and 18, as to the terminal, as shown in FIG. 19, flows of receiving channel state information reference signals by it include: step 1902: receiving channel state information reference signals of n antenna ports, the channel state information reference signals of n antenna ports being transmitted by using groups of resource elements constituted by s groups of resource elements selected from a resource block, an $A_i$-th group of resource elements being used for transmitting channel state information reference signals of $m_i$ antenna ports, s>1, n>$m_i$, 1≤i≤s; or being transmitted by using groups of resource elements constituted by all selected resource elements by selecting at least one resource element from $A_j$ resource blocks for transmitting channel state information reference signals of $m_j$ antenna ports in r resource blocks, r>1, n>$m_j$, 1≤j≤r. In such a technical solution, as resource elements in each resource block for transmitting CSI-RSs of 2, 4 or 8 antenna ports, are defined in existing standards, groups of resource elements for transmitting CSI-RSs of more antenna ports may be obtained in a combined manner by selecting resource elements originally used for transmitting CSI-RSs of 2, 4 or 8 antenna ports from one or more resource blocks, thereby facilitating fully bringing performance of a large-scale antenna system into play, and further acquiring a system capacity gain brought by a large amount of antennas. And at the same time, as the resource elements originally used for transmitting CSI-RSs of 2, 4 or 8 antenna ports are used, the number of transmission antenna ports supported by the CSI-RSs is extended, while reducing influence on previous users as possible.

Figure 20:
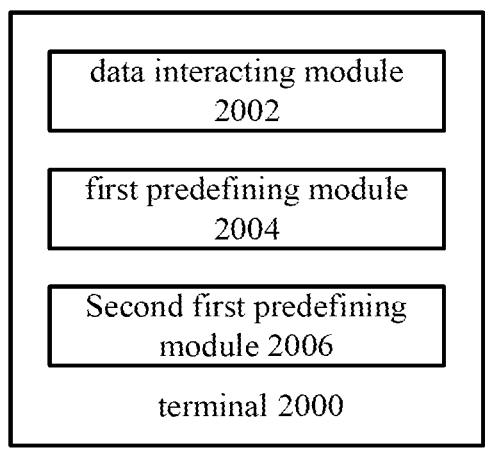
FIG. 20 shows a block diagram of a terminal according to an embodiment of the present disclosure.

Corresponding to the steps shown in FIG. 19, a corresponding structure of the terminal is as shown in FIG. 20. The terminal 2000 includes: a data interacting module 2002 configured to receive channel state information reference signals of n antenna ports, the channel state information reference signals of n antenna ports being transmitted by using groups of resource elements constituted by s groups of resource elements selected from a resource block, an $A_i$-th group of resource elements being used for transmitting channel state information reference signals of $m_i$ antenna ports, s>1, n>$m_i$, 1≤i≤s; or being transmitted by using groups of resource elements constituted by all selected resource elements by selecting at least one resource element from $A_j$ resource blocks for transmitting channel state information reference signals of $m_j$ antenna ports in r resource blocks, r>1, n>$m_j$, 1≤j≤r.

For example, when the resource element group is from the one resource block, the data interacting module 2002 further receives indication signaling, the indication signaling including first joint signaling and s pieces of first configuration signaling corresponding to the s groups of resource elements; the first joint signaling includes a numerical value of a total number n of the antenna ports, a periodicity of the resource block in a time domain and its offset in the time domain periodicity, and a power ratio $\gamma_i$ of assumed data channel transmission of a receiver of the indication signaling in feeding back channel state information; and the first configuration signaling corresponding to the $A_i$-th group of resource elements includes a number $m_i$ of antenna ports and a position of the $A_i$ group of resource elements in the resource block.

For example, when the resource element group is from the r resource blocks, the data interacting module 2002 further receives indication signaling, the indication signaling including second joint signaling and r pieces of second configuration signaling corresponding to the r resource blocks; the second joint signaling includes a numerical value of a total number n of the antenna ports, and the second configuration signaling corresponding to the $A_j$-th resource block includes a numerical value of a number $m_j$ of antenna ports, information on positions of selected resource elements in the $A_j$-th resource block, information on a position of the $A_j$-th resource block, and a power ratio $\gamma_j$ of assumed data channel transmission of a receiver of the indication signaling in feeding back channel state information.

For example, when the r resource blocks are located in different subframes of time domain, the information on a position of the $A_j$-th resource block includes periodicity information and offset information, the periodicity information being used for indicating a periodicity of the $A_j$-th resource block in a time domain, and the offset information being used for indicating an offset of the $A_j$-th resource block in a time domain periodicity; or when the r resource blocks are located in different subcarriers of frequency domain, the information on a position of the $A_j$-th resource block includes time domain information and frequency domain information, the time domain information being used for indicating a periodicity and offset of the $A_j$-th resource block in a time domain, and the frequency domain information being used for indicating a periodicity and offset of the $A_j$-th resource block in a frequency domain.

For example, when the resource element group is from the r resource blocks, the data interacting module 2002 further receives indication signaling, the indication signaling including third joint signaling and r pieces of third configuration signaling corresponding to the r resource blocks; wherein, the third joint signaling includes a numerical value of a total number n of the antenna ports, information on a position of a designated resource block in the r resource blocks, information on a relative position between the $A_j$-th resource block and the designated resource block, and a power ratio $\gamma_j$ of assumed data channel transmission of a receiver of the indication signaling in feeding back channel state information; and the third configuration signaling corresponding to the $A_j$-th resource block includes a numerical value of the number $m_j$ of antenna ports, and information on positions of selected resource elements in the $A_j$-th resource block.

For example, when the r resource blocks are located in different subframes of time domain, the information on a relative position includes offset information, the offset information being used for indicating an offset of the $A_j$-th resource block from the designated resource block in a time domain; or when the r resource blocks are located in different subcarriers of frequency domain, the third joint signaling further includes: a periodicity and offset of the r resource blocks in a time domain; and the information on a relative position includes offset information, the offset information being used for indicating an offset of the $A_j$-th resource block from the designated resource block in a frequency domain.

For example, the terminal further includes: a first predefining module 2004 configured to, when the r resource blocks are located in different subframes of time domain, predefine an offset of the r resource blocks in a time domain, or when the r resource blocks are located in different subcarriers of frequency domain, predefine an offset of the r resource blocks in a frequency domain; when the resource element group is from the r resource blocks, the data interacting module further receives indication signaling, the indication signaling including: a numerical value of a number $m_j$ of antenna ports, a numerical value of a total number n of the antenna ports, information on a position of a designated resource block in the r resource elements in a time domain, and a power ratio $\gamma_j$ of assumed data channel transmission in feeding back channel state information by the terminal.

For example, the terminal further includes: a second predefining module 2006 configured to predefine positions of the selected resource elements in each resource block; when the resource element group is from the r resource blocks, the data interacting module further receives indication signaling, the indication signaling including fourth joint signaling and r pieces of fourth configuration signaling corresponding to the r resource blocks; the fourth joint signaling includes a numerical value of a total number n of the antenna ports, and the fourth configuration signaling corresponding to the $A_j$-th resource block includes a numerical value of a number $m_j$ of antenna ports, information on the position of the $A_j$-th resource block, and a power ratio $\gamma_j$ of assumed data channel transmission in feeding back channel state information by the terminal; or the fourth joint signaling includes a numerical value of a total number n of the antenna ports, information on a position of a designated resource block in the r resource elements in a time domain, information on a relative position between the $A_j$-th resource block and the designated resource block, and a power ratio $\gamma_j$ of assumed data channel transmission of a receiver of the indication signaling in feeding back channel state information; and the fourth configuration signaling corresponding to the $A_j$-th resource block includes a numerical value of the number $m_j$ of antenna ports.

For example, the channel state information reference signals of the n antenna ports are channel state information reference signals of 16 antenna ports, and the channel state information reference signals of 16 antenna ports are transmitted by using a group of resource elements constituted by two groups of resource elements selected from one or two resource blocks for transmitting channel state information reference signals of 8 antenna ports, the number of the resource elements in each of the groups of resource elements is 8.

For example, in each of the resource blocks, the resource elements for transmitting channel state information reference signals of 8 antenna ports are configured into multiple groups; when the resource blocks are normal cyclic prefix subframes, the resource elements are configured into five groups, and when the resource blocks are extended cyclic prefix subframes, the resource elements are configured into four groups, and the constituting a resource element group to which channel state information reference signals of 16 antenna ports correspond includes: selecting two designated groups from multiple groups to which a resource block corresponds, or selecting a designated group from multiple groups to which a first resource block corresponds and a designated group from multiple groups to which a second resource block corresponds from the two resource blocks, so as to constitute the resource element group to which the channel state information reference signals of the 16 antenna ports correspond by using the two selected groups of resource elements; the first resource block and the second resource block are located at different subframes of time domain or are located at different subcarriers of frequency domain.

For example, when a group is respectively selected from the first resource block and the second resource block to constitute the group of resource elements, if the first resource block and the second resource block are located at different subframes of time domain, if periodicities of the selected resource elements in the first resource block and the selected resource elements in the second resource block are identical, the indication signaling includes offset information, the offset information being used for indicating an offset between the selected resource elements in the first resource block and the selected resource elements in the second resource block in the time domain; and if periodicities of the selected resource elements in the first resource block and the selected resource elements in the second resource block are different, the indication signaling includes periodicity information and offset information, the periodicity information being used for indicating periodicities of the selected resource elements in the first resource block and the selected resource elements in the second resource block in the time domain, and the offset information being used for indicating an offset between the selected resource elements in the first resource block and the selected resource elements in the second resource block in the time domain; or when the first resource block and the second resource block are located at different subcarriers of frequency domain, the indication signaling includes periodicity information and offset information, the periodicity information being used for indicating periodicities of the selected resource elements in the first resource block and the selected resource elements in the second resource block in the frequency domain, and the offset information being used for indicating an offset between the selected resource elements in the first resource block and the selected resource elements in the second resource block in the frequency domain.

For example, the indication signaling received by the data interacting module 2002 is transmitted by using a radio resource control (RRC) protocol.

For example, other resource elements than the resource elements for transmitting channel state information reference signals of 8 antenna ports are selected from each of the resource blocks, so as to constitute the resource element group by using the selected resource elements for transmitting channel state information reference signals of 8 antenna ports and/or the other resource elements.

Figure 21:
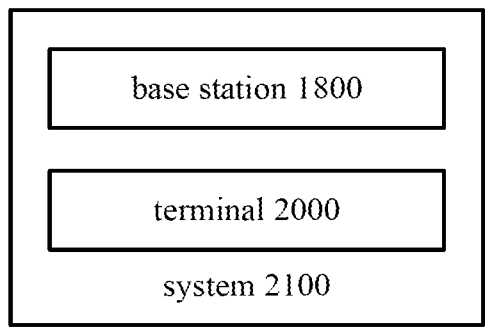
FIG. 21 shows a block diagram of a system according to an embodiment of the present disclosure.

FIG. 21 shows a block diagram of a system according to an embodiment of the present disclosure.

As shown in FIG. 21, the present disclosure further proposes a system, including the base station 1800 as shown in FIG. 18 and the terminal 2000 as shown in FIG. 20.

The present disclosure further proposes a machine-readable program (not shown), wherein when the program is executed in a base station, the program enables a machine to carry out the transmission method of a channel state information reference signal as described above in the base station.

The present disclosure further proposes a storage medium (not shown) in which a machine-readable program is stored, wherein the machine-readable program enables a machine to carry out the transmission method of a channel state information reference signal as described above in a base station.

The technical solutions of the present disclosure are described above in detail with reference to the accompanying drawings. Taking into account that CSI-RSs of at most 8 antenna ports are only supported in related technologies, the present disclosure proposes a transmission method of a channel state information reference signal, base station, terminal, system, machine-readable program and storage medium storing a machine-readable program. The present disclosure may provide CSI-RSs supporting more antenna ports according to CSI-RSs of existing antenna ports of a low number, thereby fully bringing performance of a large-scale antenna system into play, and further acquiring a system capacity gain brought by a large amount of antennas.

What described above are preferred embodiments of the present disclosure only, and are not intended to limit the present disclosure. Various variations and modifications may be made by those skilled in the art. And all the amendments, equivalents and improvements made within the spirits and principle of the present disclosure are covered by the protection scope of the present disclosure.

What is claimed is:

1. A base station, comprising:
a memory that stores a plurality of instructions;
a processor that couples to the memory and causes the base station to:
select s groups of resource elements from a resource block, an $A_i$-th group of resource elements being used for transmitting resource elements of channel state information reference signals of $m_i$ antenna ports, so as to constitute a resource element group to which channel state information reference signals of n antenna ports correspond; where, the $A_i$-th group of resource elements is one group out of the s groups of resource elements, $n>m_i$, $n>m_j$, $1\le i\le s$, $1\le j\le r$; or in r resource blocks, select at least one resource element from an $A_j$-th resource block for transmitting channel state information reference signals of $m_j$ antenna ports, and constitute a resource element group to which channel state information reference signals of n antenna ports correspond by using all the selected resource elements; where, $r>1$, $n>m_j$, $1\le i\le s$, $1\le j\le r$; and
transmit the channel state information reference signals of the n antenna ports to one or more terminals by using the resource element group,
wherein the processor further causes the base station to:
when the resource element group is from the one resource block, transmit indication signaling to the terminal, the indication signaling comprising first joint signaling and s pieces of first configuration signaling corresponding to the s groups of resource elements; and wherein,
the first joint signaling comprises a numerical value of a total number n of the antenna ports, a periodicity of the resource block in a time domain and its offset in the time domain periodicity, and a power ratio $\gamma_i$ of assumed data channel transmission in feeding back channel state information by the terminal; and the first configuration signaling corresponding to the $A_i$-th group of resource elements comprises a number mi of antenna ports and a position of the $A_i$ group of resource elements in the resource block.

2. The base station according to claim 1, wherein the processor further causes the base station to:
when the resource element group is from the r resource blocks, transmit indication signaling to the terminal, the indication signaling comprising second joint signaling and r pieces of second configuration signaling corresponding to the r resource blocks; and wherein,
the second joint signaling comprises a numerical value of a total number n of the antenna ports, and the second configuration signaling corresponding to the $A_j$-th resource block comprises a numerical value of a number $m_j$ of antenna ports, information on positions of selected resource elements in the $A_j$-th resource block, information on a position of the $A_j$-th resource block, and a power ratio $\gamma_j$ of assumed data channel transmission in feeding back channel state information by the terminal.

3. The base station according to claim 2, wherein when the r resource blocks are located in different subframes of time domain,
the information on a position of the $A_j$-th resource block comprises periodicity information and offset information, the periodicity information being used for indicating a periodicity of the $A_j$-th resource block in a time domain, and the offset information being used for indicating an offset of the $A_j$-th resource block in a time domain periodicity;
or when the r resource blocks are located in different subcarriers of frequency domain,
the information on a position of the $A_j$-th resource block comprises time domain information and frequency domain information, the time domain information being used for indicating a periodicity and offset of the $A_j$-th resource block in a time domain, and the frequency domain information being used for indicating a periodicity and offset of the $A_j$-th resource block in a frequency domain.

4. The base station according to claim 2, wherein the processor further causes the base station to:
when the resource element group is from the r resource blocks, transmit indication signaling to the terminal, the indication signaling comprising third joint signaling and r pieces of third configuration signaling corresponding to the r resource blocks; and wherein,
the third joint signaling comprises a numerical value of a total number n of the antenna ports, information on a position of a designated resource block in the r resource blocks, information on a relative position between the $A_j$-th resource block and the designated resource block, and a power ratio $\gamma_j$ of assumed data channel transmission in feeding back channel state information by the terminal; and the third configuration signaling corresponding to the $A_j$-th resource block comprises a numerical value of the number $m_j$ of antenna ports, and information on positions of selected resource elements in the $A_j$-th resource block.

5. The base station according to claim 4, wherein when the r resource blocks are located in different subframes of time domain,
the information on a relative position comprises offset information, the offset information being used for indicating an offset of the $A_j$-th resource block from the designated resource block in a time domain;
or when the r resource blocks are located in different subframes of frequency domain, the third joint signaling further comprises:
a periodicity and offset of the r resource blocks in a time domain; and the information on a relative position comprises offset information, the offset information being used for indicating an offset of the $A_j$-th resource block from the designated resource block in a frequency domain.

6. The base station according to claim 1, the processor further causes the base station to:
when the r resource blocks are located in different subframes of time domain, predefine an offset of the r resource blocks in a time domain, or when the r resource blocks are located in different subframes of frequency domain, predefine an offset of the r resource blocks in a frequency domain;
wherein when the resource element group is from the r resource blocks, transmit indication signaling to the terminal, the indication signaling comprising: a numerical value of a number $m_j$ of antenna ports, a numerical value of a total number n of the antenna ports, information on a position of a designated resource block in the r resource elements in a time domain, and a power ratio $\gamma_j$ of assumed data channel transmission in feeding back channel state information by the terminal.

7. The base station according to claim 1, the processor further causes the base station to:
predefine positions of the selected resource elements in each resource block;
wherein when the resource element group is from the r resource blocks, transmit indication signaling to the terminal, the indication signaling comprising fourth joint signaling and r pieces of fourth configuration signaling corresponding to the r resource blocks; and wherein,
the fourth joint signaling comprises a numerical value of a total number n of the antenna ports, and the fourth configuration signaling corresponding to the $A_j$-th resource block comprises a numerical value of a number $m_j$ of antenna ports, information on the position of the $A_j$-th resource block, and a power ratio $\gamma_j$ of assumed data channel transmission in feeding back channel state information by the terminal; or
the fourth joint signaling comprises a numerical value of a total number n of the antenna ports, information on a position of a designated resource block in the r resource elements in a time domain, information on a relative position between the $A_j$-th resource block and the designated resource block, and a power ratio $\gamma_j$ of assumed data channel transmission in feeding back channel state information by the terminal; and the fourth configuration signaling corresponding to the $A_j$-th resource block comprises a numerical value of the number $m_j$ of antenna ports.

8. The base station according to claim 1, wherein the indication signaling is transmitted by using a radio resource control (RRC) protocol.

9. The base station according to claim 1, wherein the processor further causes the base station to:
select two groups of resource elements from one or two resource blocks for transmitting channel state information reference signals of 8 antenna ports, the number of resource elements in each group being 8, so as to constitute a group of resource elements to which channel state information reference signals of 16 antenna ports correspond.

10. The base station according to claim 9, wherein,
in each of the resource blocks, the resource elements for transmitting channel state information reference signals of 8 antenna ports are configured into multiple groups; wherein when the resource blocks are normal cyclic prefix subframes, the resource elements are configured into five groups, and when the resource blocks are extended cyclic prefix subframes, the resource elements are configured into four groups, and the processor further causes the base station to:
select two designated groups from multiple groups to which a resource block corresponds, or select a designated group from multiple groups to which a first resource block corresponds and a designated group from multiple groups to which a second resource block corresponds from the two resource blocks, so as to constitute the resource element group of to which the channel state information reference signals of the 16 antenna ports correspond by using the two selected groups of resource elements; wherein the first resource block and the second resource block are located at different subframes of time domain or are located at different subcarriers of frequency domain.

11. The base station according to claim 10, wherein when the resource blocks are normal cyclic prefix subframes, each of the resource blocks comprises 12 subcarriers in a frequency domain numbered as 0-11 in turn, and 14 OFDM symbols in a time domain numbered as 0-13 in turn, and the processor further causes the base station to:
in each of the resource blocks, select resource elements located at a 3rd, 4th, 9th and 10th subcarriers in the frequency domain and at a 6th and 7th OFDM symbols in the time domain, and resource elements located at a 5th, 6th, 11th and 12th subcarriers in the frequency domain and at a 10th and 11th OFDM symbols in the time domain, so as to constitute the groups of resource elements, or select resource elements located at a 1st, 2nd, 3rd, 4th, 7th, 8th, 9th and 10th subcarriers in the frequency domain and at a 10th and 11th OFDM symbols in the time domain, so as to constitute the resource element group.

12. The base station according to claim 10, wherein when the resource blocks are normal cyclic prefix subframes, each of the resource blocks comprises 12 subcarriers in a frequency domain numbered as 0-11 in turn, and 14 OFDM symbols in a time domain numbered as 0-13 in turn; and wherein, when the first resource block and the second resource block are located at different subframes of time domain, the processor further causes the base station to:
select resource elements located at a 3rd, 4th, 9th and 10th subcarriers in the frequency domain and at a 6th and 7th OFDM symbols in the time domain in the first resource block, and a 5th, 6th, 11th and 12th subcarriers in the frequency domain and at a 10th and 11th OFDM symbols in the time domain in the second resource block, so as to constitute the resource element group, or
select resource elements located at a 5th, 6th, 11th and 12th subcarriers in the frequency domain and at a 10th and 11th OFDM symbols in the time domain in the first resource block, and a 3rd, 4th, 9th and 10th subcarriers in the frequency domain and at a 10th and 11th OFDM symbols in the time domain in the second resource block, so as to constitute the resource element group, or
select resource elements located at a 3rd, 4th, 9th and 10th subcarriers in the frequency domain and at a 10th and 11th OFDM symbols in the time domain in the first resource block, and a 1st, 2nd, 7th and 8th subcarriers in the frequency domain and at a 10th and 11th OFDM symbols in the time domain in the second resource block, so as to constitute the resource element group, or
select resource elements located at a 1st, 2nd, 7th and 8th subcarriers in the frequency domain and at a 10th and 11th OFDM symbols in the time domain in the first resource block, and a 3rd, 4th, 9th and 10th subcarriers in the frequency domain and at a 13th and 14th OFDM symbols in the time domain in the second resource block, so as to constitute the resource element group, or
select resource elements located at a 3rd, 4th, 9th and 10th subcarriers in the frequency domain and at a 13th and 14th OFDM symbols in the time domain in the first resource block, and a 3rd, 4th, 9th and 10th subcarriers in the frequency domain and at a 6th and 7th OFDM symbols in the time domain in the second resource block, so as to constitute the resource element group.

13. The base station according to claim 10, wherein when the resource blocks are normal cyclic prefix subframes, each of the resource blocks comprises 12 subcarriers in a frequency domain numbered as 0-11 in turn, and 14 OFDM symbols in a time domain numbered as 0-13 in turn; and wherein when the first resource block and the second resource block are located at different subframes of frequency domain, the processor further causes the base station to:

select resource elements located at a 3rd, 4th, 9th and 10th subcarriers in the frequency domain and at a 6th and 7th OFDM symbols in the time domain in the first resource block, and a 3rd, 4th, 9th and 10th subcarriers in the frequency domain and at a 6th and 7th OFDM symbols in the time domain in the second resource block, so as to constitute the resource element group, or select resource elements located at a 5th, 6th, 11th and 12th subcarriers in the frequency domain and at a 10th and 11th OFDM symbols in the time domain in the first resource block, and a 5th, 6th, 11th and 12th subcarriers in the frequency domain and at a 10th and 11th OFDM symbols in the time domain in the second resource block, so as to constitute the resource element group, or select resource elements located at a 3rd, 4th, 9th and 10th subcarriers in the frequency domain and at a 10th and 11th OFDM symbols in the time domain in the first resource block, and a 1 3rd, 4th, 9th and 10th subcarriers in the frequency domain and at a 10th and 11th OFDM symbols in the time domain in the second resource block, so as to constitute the resource element group, or select resource elements located at a 1st, 2nd, 7th and 8th subcarriers in the frequency domain and at a 10th and 11th OFDM symbols in the time domain in the first resource block, and a 1st, 2nd, 7th and 8th subcarriers in the frequency domain and at a 10th and 11th OFDM symbols in the time domain in the second resource block, so as to constitute the resource element group, or select resource elements located at a 3rd, 4th, 9th and 10th subcarriers in the frequency domain and at a 13th and 14th OFDM symbols in the time domain in the first resource block, and a 3rd, 4th, 9th and 10th subcarriers in the frequency domain and at a 13th and 14th OFDM symbols in the time domain in the second resource block, so as to constitute the resource element group.

14. The base station according to claim 9, the processor further causes the base station to:

select other resource elements from each of the resource blocks than the resource elements for transmitting channel state information reference signals of 8 antenna ports, so as to constitute the resource element group by using the selected resource elements for transmitting channel state information reference signals of 8 antenna ports and/or the other resource elements;

wherein when the resource blocks are normal cyclic prefix subframes, each of the resource blocks comprises 12 subcarriers in a frequency domain numbered as 0-11 in turn, and 14 OFDM symbols in a time domain numbered as 0-13 in turn; and in each of the resource blocks, select all resource elements located at a 3rd and 4th OFDM symbols in a time domain, and resource elements located at a 5th and 8th subcarriers in a frequency domain and a 6th, 7th, 13th and 14th OFDM symbols in a time domain as the other resource elements;

or when the resource blocks are extended cyclic prefix subframes, each of the resource blocks comprises 12 subcarriers in a frequency domain numbered as 0-11 in turn, and 12 OFDM symbols in a time domain numbered as 0-11 in turn; and in each of the resource blocks, select all resource elements located at a 2nd, 3rd, 8th and 9th OFDM symbols in a time domain as the other resource elements.

15. The base station according to claim 14, wherein when the resource blocks are normal cyclic prefix subframes, the processor further causes the base station to:

in each of the resource blocks, select resource elements located at a 5th, 6th, 11th and 12th subcarriers in the frequency domain and at a 3rd and 4th OFDM symbols in the time domain, and at a 3rd, 4th, 9th and 10th subcarriers in the frequency domain and at a 10th and 11th OFDM symbols in the time domain, so as to constitute the resource element group, or in each of the resource blocks, select resource elements located at a 3rd, 4th, 9th and 10th subcarriers in the frequency domain and at a 3rd and 4th OFDM symbols in the time domain, and at a 1st, 2nd, 7th and 8th subcarriers in the frequency domain and at a 10th and 11th OFDM symbols in the time domain, so as to constitute the resource element group, or in each of the resource blocks, select resource elements located at a 1st, 2nd, 7th and 8th subcarriers in the frequency domain and at a 3rd and 4th OFDM symbols in the time domain, and at a 3rd, 4th, 9th and 10th subcarriers in the frequency domain and at a 13th and 14th OFDM symbols in the time domain, so as to constitute the resource element group, or in each of the resource blocks, select resource elements located at a 3rd, 4th, 9th and 10th subcarriers in the frequency domain and at a 6th and 7th OFDM symbols in the time domain, and at a 5th, 6th, 11th and 12th subcarriers in the frequency domain and at a 10th and 11th OFDM symbols in the time domain, so as to constitute the resource element group, or in each of the resource blocks, select resource elements located at a 3rd, 6th, 9th and 12th subcarriers in the frequency domain and at a 5th and 6th OFDM symbols in the time domain, and at a 2nd, 5th, 8th and 11th subcarriers in the frequency domain and at an 8th and 9th OFDM symbols in the time domain, so as to constitute the resource element group, or in each of the resource blocks, select resource elements located at a 1st, 4th, 7th and 10th subcarriers in the frequency domain and at a 5th and 6th OFDM symbols in the time domain, and at a 1st, 4th, 7th and 10th subcarriers in the frequency domain and at an 11th and 12th OFDM symbols in the time domain, so as to constitute the resource element group, or in each of the resource blocks, select resource elements located at a 3rd, 6th, 9th and 12th subcarriers in the frequency domain and at an 8th and 9th OFDM symbols in the time domain, and at a 2nd, 5th, 8th and 11th subcarriers in the frequency domain and at an 11th and 12th OFDM symbols in the time domain, so as to constitute the resource element group.

16. A terminal, comprising:

a memory that stores a plurality of instructions;

a processor that couples to the memory and causes the terminal to: receive channel state information reference signals of n antenna ports, the channel state information reference signals of n antenna ports being transmitted by using a resource element group constituted by s groups of resource elements selected from a resource block, an $A_t$-th group of resource elements being used for transmitting channel state information reference signals of $m_i$ antenna ports, wherein, the $A_t$-th group of resource elements is one group out of the s groups of resource elements, s>1, n>$m_i$, 1≤i≤s; or being transmitted by using resource element group constituted by all selected resource elements by selecting at least one resource element from an $A_j$-th resource block for transmitting channel state information reference signals of $m_j$ antenna ports in r resource blocks, r>1, n>$m_j$, 1≤j≤s, wherein the processor is further configured to:

when the resource element group is from the one resource block, receive indication signaling, the indication signaling comprising first joint signaling and s pieces of first configuration signaling corresponding to the s groups of resource elements; and wherein the first joint signaling comprises a numerical value of a total number n of the antenna ports, a periodicity of the resource block in a time domain and its offset in the time domain periodicity, and a power ratio $\gamma_i$ of assumed data channel transmission of a receiver of the indication signaling in feeding back channel state information; and the first configuration signaling corresponding to the $A_i$-th group of resource elements comprises a number $m_i$ of antenna ports and a position of the $A_i$ group of resource elements in the resource block.

17. The terminal according to claim 16, wherein the processor further causes the terminal to:

when the resource element group is from the r resource blocks, receive indication signaling, the indication signaling comprising second joint signaling and r pieces of second configuration signaling corresponding to the r resource blocks; and wherein, the second joint signaling comprises a numerical value of a total number n of the antenna ports, and the second configuration signaling corresponding to the $A_j$-th resource block comprises a numerical value of a number $m_j$ of antenna ports, information on positions of selected resource elements in the $A_j$-th resource block, information on a position of the $A_j$-th resource block, and a power ratio $\gamma_j$ of assumed data channel transmission of a receiver of the indication signaling in feeding back channel state information.

18. A system, comprising: a base station; and a terminal; wherein the base station comprises:

a first memory that stores a first plurality of instructions;

a first processor that couples to the first memory and causes the base station to:

select s groups of resource elements from a resource block, an $A_i$-th group of resource elements being used for transmitting resource elements of channel state information reference signals of $m_i$ antenna ports, so as to constitute a resource element group to which channel state information reference signals of n antenna ports correspond; where, the $A_i$-th group of resource elements is one group out of the s groups of resource elements, n>$m_i$, n>$m_j$, 1≤i≤s, 1≤j≤r; or in r resource blocks, select at least one resource element from an $A_j$-th resource block for transmitting channel state information reference signals of $m_j$ antenna ports, and constitute a resource element group to which channel state information reference signals of n antenna ports correspond by using all the selected resource elements; where, r>1, n>$m_j$, 1≤i≤s, 1≤j≤r; and transmit the channel state information reference signals of the n antenna ports to the terminal by using the resource element group, wherein the first processor further causes the base station to:

when the resource element group is from the one resource block, transmit indication signaling to the terminal, the indication signaling comprising first joint signaling and s pieces of first configuration signaling corresponding to the s groups of resource elements; and wherein, the first joint signaling comprises a numerical value of a total number n of the antenna ports, a periodicity of the resource block in a time domain and its offset in the time domain periodicity, and a power ratio $\gamma_i$ of assumed data channel transmission in feeding back channel state information by the terminal; and the first configuration signaling corresponding to the $A_i$-th group of resource elements comprises a number mi of antenna ports and a position of the $A_i$ group of resource elements in the resource block;

wherein the terminal comprises:

a second memory that stores a second plurality of instructions;

a second processor that couples to the second memory and causes the terminal to:

receive the channel state information reference signals of the n antenna ports from the base station, wherein the second processor is further configured to:

when the resource element group is from the one resource block, receive the indication signaling from the base station.

* * * * *